(12) United States Patent
Tamura

(10) Patent No.: US 9,930,644 B2
(45) Date of Patent: Mar. 27, 2018

(54) WIRELESS COMMUNICATION DEVICE, WIRELESS COMMUNICATION METHOD, AND COMPUTER-READABLE RECORDING MEDIUM STORING WIRELESS COMMUNICATION PROGRAM

(71) Applicant: FUJITSU LIMITED, Kawasaki-shi, Kanagawa (JP)

(72) Inventor: Toshiya Tamura, Kokubunji (JP)

(73) Assignee: FUJITSU LIMITED, Kawasaki (JP)

(*) Notice: Subject to any disclaimer, the term of this patent is extended or adjusted under 35 U.S.C. 154(b) by 203 days.

(21) Appl. No.: 14/811,677

(22) Filed: Jul. 28, 2015

(65) Prior Publication Data

US 2016/0037504 A1 Feb. 4, 2016

(30) Foreign Application Priority Data

Aug. 1, 2014 (JP) ................. 2014-157385

(51) Int. Cl.
| | | |
|---|---|---|
| *H04W 72/04* | (2009.01) | |
| *H04W 76/02* | (2009.01) | |
| *H04W 88/08* | (2009.01) | |
| *H04W 88/02* | (2009.01) | |

(52) U.S. Cl.
CPC ... *H04W 72/0406* (2013.01); *H04W 72/0446* (2013.01); *H04W 76/023* (2013.01); *H04W 88/02* (2013.01); *H04W 88/08* (2013.01)

(58) Field of Classification Search
CPC . H04L 29/06; H04B 7/18541; H04B 7/18556; H04M 1/6505; H04N 7/17309
See application file for complete search history.

(56) References Cited

U.S. PATENT DOCUMENTS

| | | |
|---|---|---|
| 2004/0063458 A1 | 4/2004 | Hori et al. |
| 2007/0230423 A1 | 10/2007 | Yoshida et al. |
| 2009/0310583 A1 | 12/2009 | Suzuki |
| 2013/0089010 A1* | 4/2013 | Richardson ............. H04W 8/22 370/280 |
| 2013/0142170 A1 | 6/2013 | Sakai |

FOREIGN PATENT DOCUMENTS

| | | |
|---|---|---|
| JP | 2004-128785 | 4/2004 |
| JP | 2007-295541 | 11/2007 |

OTHER PUBLICATIONS

EESR of European Patent Application No. 15178702.5 dated Feb. 23, 2016.
IEEE Standard for Information technology—802.11n, 2009.
Wi-Fi Peer-to-peer(P2P) Technical Specification version 1.4 Wi-Fi Alliance, 2014.
Wi-Fi Display Technical Specification Version 1.0.0. Wi-Fi Alliance, 2012.

* cited by examiner

*Primary Examiner* — Chandrahas B Patel
(74) *Attorney, Agent, or Firm* — Maschoff Brennan

(57) ABSTRACT

A wireless communication device includes: a memory; and one or more processors coupled to the memory, which, while performing first wireless communication with a base station using a wireless channel, performs, using the wireless channel without the base station, second wireless communication with a wireless communication device of a communication partner.

17 Claims, 24 Drawing Sheets

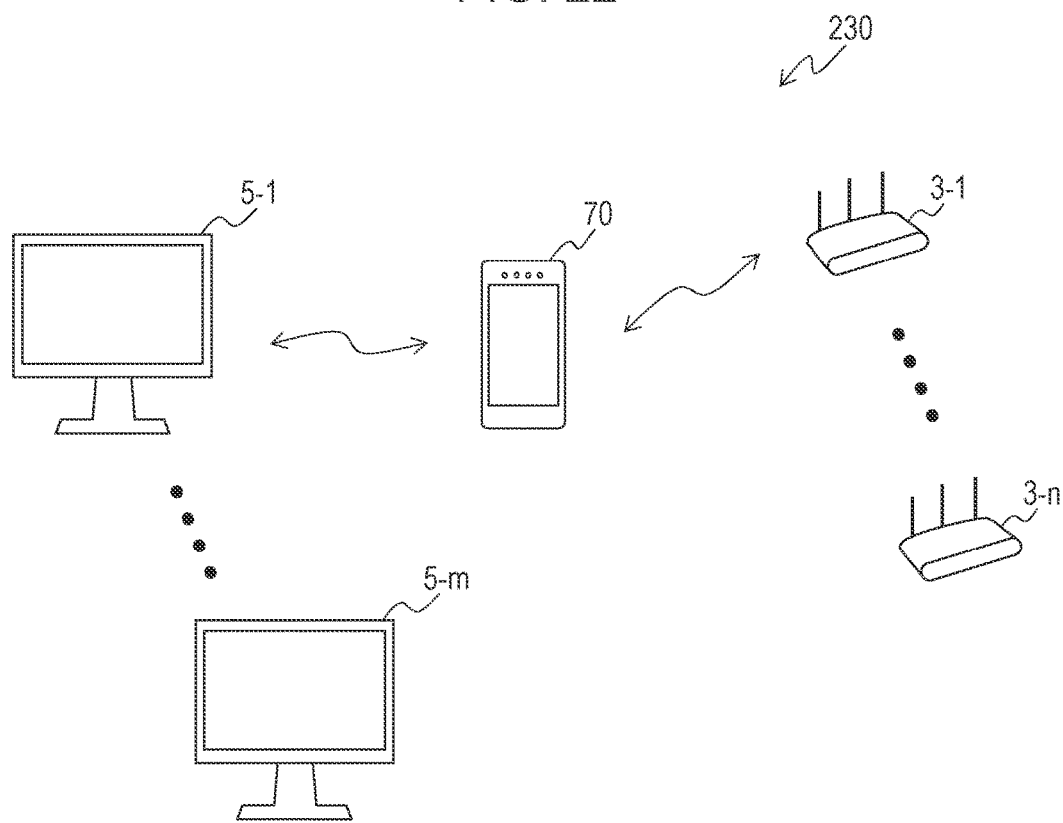

WIRELESS COMMUNICATION DEVICE, WIRELESS COMMUNICATION METHOD, AND COMPUTER-READABLE RECORDING MEDIUM STORING WIRELESS COMMUNICATION PROGRAM

CROSS-REFERENCE TO RELATED APPLICATION

This application is based upon and claims the benefit of priority of the prior Japanese Patent Application No. 2014-157385, filed on Aug. 1, 2014, the entire contents of which are incorporated herein by reference.

FIELD

The embodiments discussed herein are related to a wireless communication device, a wireless communication method, and a computer-readable storage medium configured to store a wireless communication program.

BACKGROUND

Recently, with the growing penetration of wireless communication devices such as a multi-function mobile phone, various application programs have been developed. In such wireless communication devices, functions used for wireless technologies including a wireless local area network (WLAN, and also referred to as a wireless LAN) and Bluetooth (trademark) are provided. Therefore, development of application programs using such wireless technologies has been also become popular, and it is expected that services using wireless technologies will increasingly spread in the future.

An example of a system using the wireless technology, a wireless communication system described below is known that includes a base station of a wireless LAN and a plurality of terminals that communicate with each other through the base station. In such a wireless communication system, each of the terminals includes a communication section that performs terminal-to-terminal direct communication with another terminal without the base station, using a second wireless channel different from a first wireless channel used for wireless communication with the base station (for example, see Japanese Laid-Open Patent Publication No. 2007-295541).

In addition, an example is known in which a station starts communication from an infrastructure mode, searches for packets transmitted and received within an infrastructure network, and intercepts a packet destined for an access point of the station that is the last stop. At this time, it is determined that communication with a communication partner using the same ad-hoc network is allowed to be performed, and the access point causes a CH search section to search for a channel for the ad-hoc. In a switching control section, a single channel is notified to a target access point, and the station and the communication partner are caused to communicate with each other directly through the channel of the ad-hoc network (for example, see Japanese Laid-Open Patent Publication No. 2004-128785).

Standards are defined in wireless LANs. A standard specification is defined in a Peer-to-Peer (P2P) mode in which a wireless communication device performs direct communication with a wireless communication device of a communication partner without a base station in a wireless LAN. An application example using a technology is also known in which a wireless communication device performs P2P mode communication with a wireless communication device of the communication partner other than the base station while performing Station (STA) mode communication with the base station (for example, see IEEE Standard for Information technology—802.11n, 2009; Wi-Fi Peer-to-peer (P2P) Technical Specification version 1.4 Wi-Fi Alliance, 2014; and Wi-Fi Display Technical Specification Version 1.0.0. Wi-Fi Alliance, 2012).

However, for example, when a single wireless communication device performs wireless communication with a base station using a first wireless channel and direct communication with another wireless communication device using a second wireless channel different from the first wireless channel, the following problem occurs. That is, when the wireless communication device performs switching between the wireless communication using the first wireless channel and the wireless communication using the second wireless channel, a time occurs during which the communication is not performed. Specifically, a time loss caused by the switching of wireless channels occurs, so that the efficiency of transmission and reception of data in the communication is reduced.

SUMMARY

According to an aspect of the invention, a wireless communication device includes: a memory; and one or more processors coupled to the memory, which, while performing first wireless communication with a base station using a wireless channel, performs, using the wireless channel without the base station, second wireless communication with a wireless communication device of a communication partner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 is a diagram illustrating an example of a wireless communication system including a wireless communication device according to a modification 2 of the third embodiment;

FIG. 23 is a diagram illustrating an example of connection information in the modification 2 of the third embodiment;

DESCRIPTION OF EMBODIMENTS

First Embodiment

Figure 1:
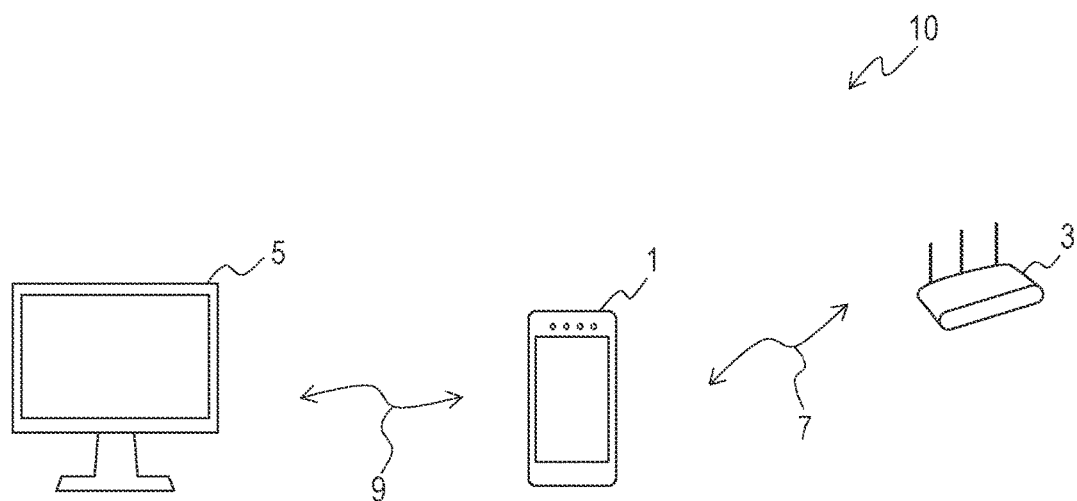
FIG. 1 is a diagram illustrating an example of a wireless communication system including a wireless communication device according to a first embodiment.

A wireless communication device 1 according to a first embodiment is described below with reference to drawings. FIG. 1 is a diagram illustrating an example of a wireless communication system including a wireless communication device according to the first embodiment. As illustrated in FIG. 1, a wireless communication system 10 includes a wireless communication device 1, a base station 3, and a wireless communication device 5. In the wireless communication system 10, at least the wireless communication device 1 and the base station 3 may communicate with each other wirelessly, and the wireless communication device 1 and the wireless communication device 5 may communicate with each other wirelessly.

The wireless communication device 1 is a wireless communication device that performs, while performing station (STA) mode communication with the base station 3, peer to peer (P2P) mode communication in which the wireless communication device 1 is directly connected with a wireless communication device of the communication partner, using an identical wireless channel. The STA mode communication is wireless communication in an infrastructure mode, which is performed between the wireless communication device 1 and the base station, and the wireless communication device 1 serves as a slave unit. The P2P mode communication corresponds to terminal-to-terminal direct communication in which the wireless communication device 1 and the wireless communication device 5 directly communicate with each other without the base station 3.

The wireless communication device 1, while performing the STA mode communication 7 with the base station 3, performs the P2P mode communication 9 directly with the wireless communication device 5, using an identical wireless channel. That is, the wireless communication device 1 performs the STA mode communication 7 and the P2P mode communication 9 so as to perform switching between the STA mode communication 7 and the P2P mode communication 9 by time division. During this time, the connection of wireless communication between the wireless communication device 1 and the base station 3, and the connection of wireless communication between the wireless communication device 1 and the wireless communication device 5 are continued. The wireless communication device 1 includes, for example, a multi-function mobile phone and various computers such as a tablet, notebook, and desktop computers each including a wireless transceiver.

The STA mode communication 7 is STA mode communication that is performed between the wireless communication device 1 and the base station 3. In the STA mode communication 7, the base station 3 is a master unit, and the wireless communication device 1 is a slave unit. The STA mode communication 7 is an example of a first wireless communication. The P2P mode communication 9 is performed between the wireless communication device 1 and the wireless communication device 5. Hereinafter, terminal-to-terminal direct communication performed without the base station 3 may be simply referred to as direct communication. The P2P mode communication 9 is an example of a second wireless communication. When the both of the first wireless communication and the second wireless communication are performed, the connection of the first wireless communication and the connection of the second wireless communication are maintained. The first wireless communication and the second wireless communication may be performed so as to be switched by time division.

The base station 3 may be an access point of a wireless LAN, in which the communication is allowed to be performed within a range that is narrower than that of a public wireless communication network. It is desirable that the base station 3 is allowed to use a plurality of wireless channels in the communication.

The wireless communication device 5 is wireless communication device that performs the P2P mode communication that is direct communication, at least, without the base station. The wireless communication device 5 may not include a function to request the P2P mode communication for a further wireless communication device. The wireless communication device 5 is a wireless communication device that performs the P2P mode communication 9 with the wireless communication device 1, and may be a wireless communication device of a communication partner of the wireless communication device 1. It is desirable that the wireless communication device 5 is allowed to use a plurality of wireless channels in the communication. The wireless communication device 5 may be an electronic device including a function to perform P2P mode communication. For example, the wireless communication device 5 includes a multi-function mobile phone and various computers such as a tablet, notebook, and desktop computers each including a wireless transceiver, an audio playback device, and a display device including a television receiver.

Figure 2:
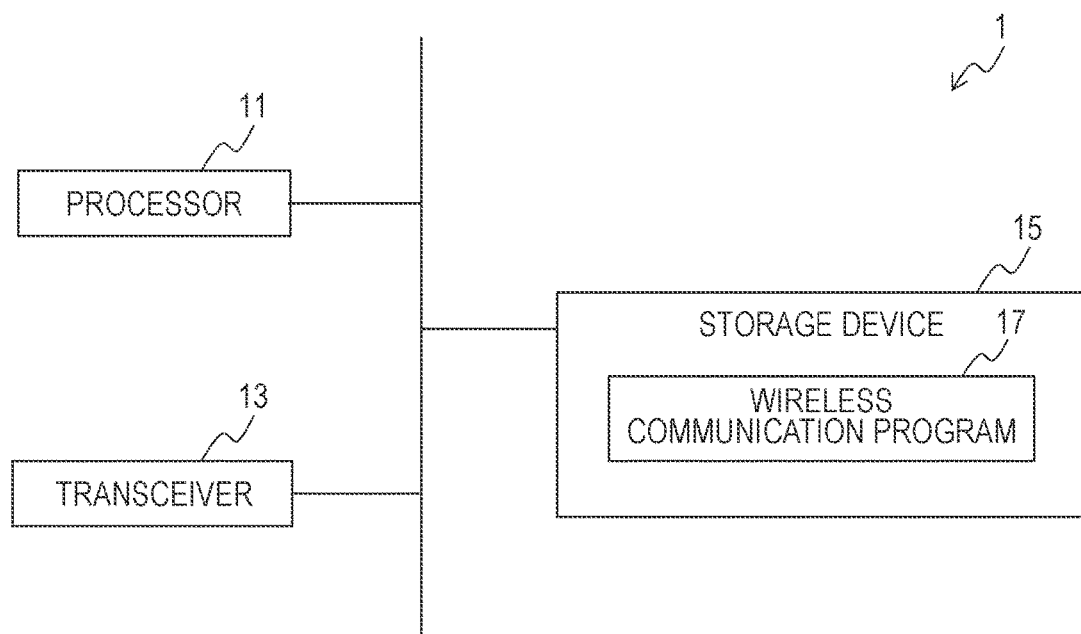
FIG. 2 is a diagram illustrating an example of a hardware configuration of the wireless communication device according to the first embodiment.

FIG. 2 is a diagram illustrating an example of a hardware configuration of the wireless communication device according to the first embodiment. The wireless communication device 1 includes one or more processors 11, a transceiver 13, and a storage device 15. The one or more processors 11 may generate a baseband signal from transmission data, and generate reception data from a baseband signal of a received wireless signal. The one or more processors 11 may execute, for example, baseband processing, generation processing of transmission data and reception data, and the like, in the wireless communication method in the first embodiment, for example, by reading and executing a wireless communication program 17 that has been stored in the storage device 15 in advance.

The transceiver 13 is a device that performs transmission and reception of wireless signals. The transceiver 13 may include, for example, an antenna and a radio frequency (RF) circuit. Transmission and reception of wireless signals are performed through the antenna. The RF circuit may modulate and amplify the baseband signal generated by the one or more processors 11 into a wireless signal of a wireless channel using a carrier signal of a certain frequency, and outputs the modulated and amplified signal to the antenna. In addition, the RF circuit may demodulate a wireless signal received through the antenna to generate a baseband signal, and output the baseband signal to the one or more processors 11.

A baseband processing circuit may be provided in the transceiver 13 instead of execution of the baseband processing by the one or more processors 11. In this case, the baseband processing circuit generates a baseband signal from transmission data, and generates reception data from a baseband signal of a received wireless signal.

The storage device 15 is, for example, a storage device that may perform reading of information or a storage device that may perform reading and writing at any time. The storage device 15 stores, for example, the wireless communication program 17. The wireless communication program 17 is a program used to control an operation of the wireless communication device 1. The storage device 15 stores information and the like obtained by the operation of the one or more processors 11, as appropriate.

Figure 3:
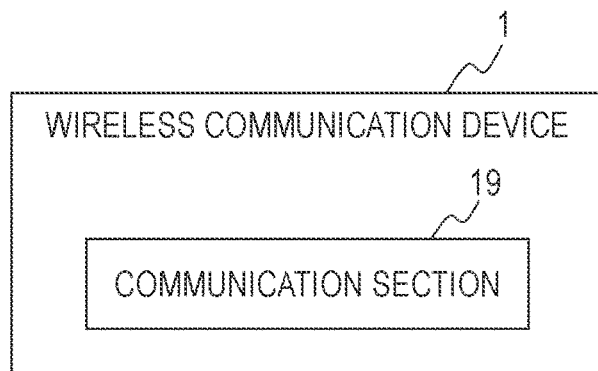
FIG. 3 is a block diagram illustrating an example of a function configuration of the wireless communication device according to the first embodiment.

FIG. 3 is a block diagram illustrating an example of a function configuration of the wireless communication device according to the first embodiment. The wireless communication device 1 includes a communication section 19. The communication section 19 corresponds to the transceiver 13. The communication section 19, while performing the STA mode communication 7 with the base station 3, performs the P2P mode communication 9 with the wireless communication device 5, using an identical wireless channel. As the method in which the STA mode communication 7 with the base station 3 is performed while the P2P mode communication 9 with the wireless communication device 5 is performed using an identical wireless channel, various methods are applied. For example, the communication section 19 may respectively request the connection of the STA mode communication 7 and the connection of the P2P mode communication 9 for the base station 3 and the wireless communication device 5, using a certain wireless channel that has been set in advance. In addition, when the connection of one of the communications has been established, the wireless channel used in the other one of the communications may be set to the wireless channel used in one of the communications to establish the connection. The operation in which the STA mode communication 7 and the P2P mode communication 9 are performed using an identical wireless channel may be controlled by causing the one or more processors 11 to read and execute the wireless communication program 17. Some of the functions of the wireless communication device 1 may be configured by hardware such as an integrated circuit.

Figure 4:
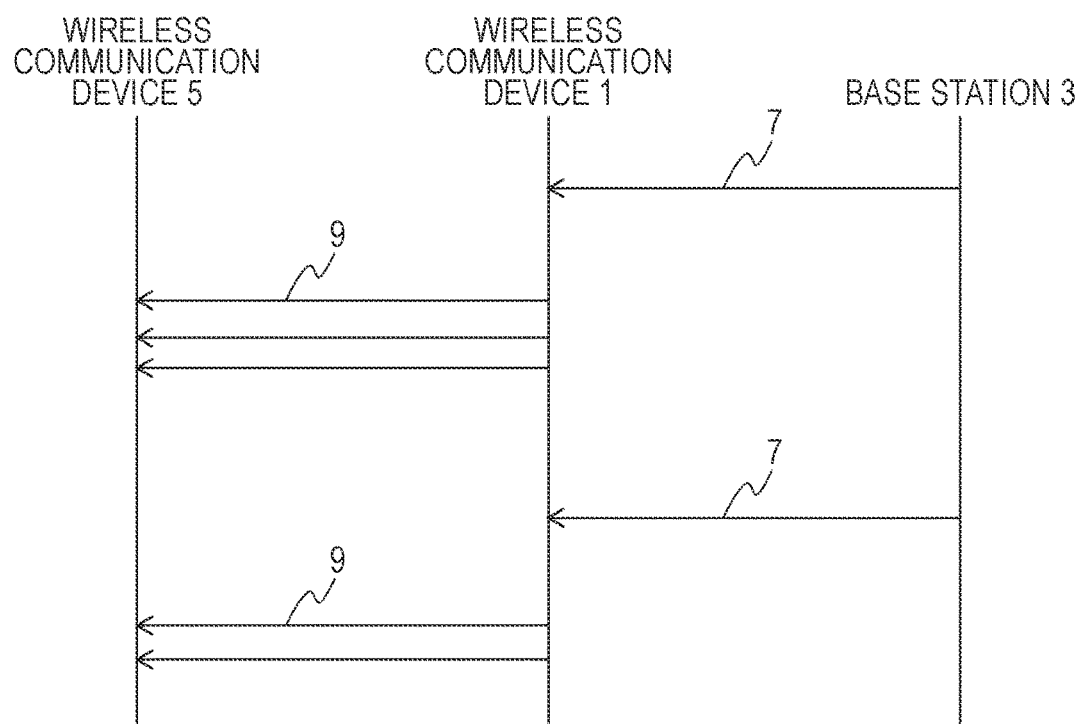
FIG. 4 is a diagram illustrating an example of a communication sequence in the wireless communication system according to the first embodiment.

FIG. 4 is a diagram illustrating an example of a communication sequence in the wireless communication system 10 according to the first embodiment. In FIG. 4, an example of a communication sequence between the wireless communication device 1, the base station 3, and the wireless communication device 5 is illustrated. As described above, the wireless communication device 1 performs the STA mode communication 7 with the base station 3. In addition, the wireless communication device 1 performs the P2P mode communication 9 with the wireless communication device 5. In such an example, the STA mode communication 7 and the P2P mode communication 9 share an identical wireless channel. In this case, when the wireless communication device 1 performs switching between the STA mode communication 7 and the P2P mode communication 9, the wireless communication device 1 switches a communication partner between the base station 3 and the wireless communication device 5. In this case, as described later, channel switching may not be performed. Therefore, a time during which the communication is not performed due to the channel switching does not occur, so that a time loss caused when the communication is switched is reduced. In the P2P mode communication 9, for example, one of the wireless communication device 1 and the wireless communication device 5 may function as a group owner after the connection has been established.

Figure 5:
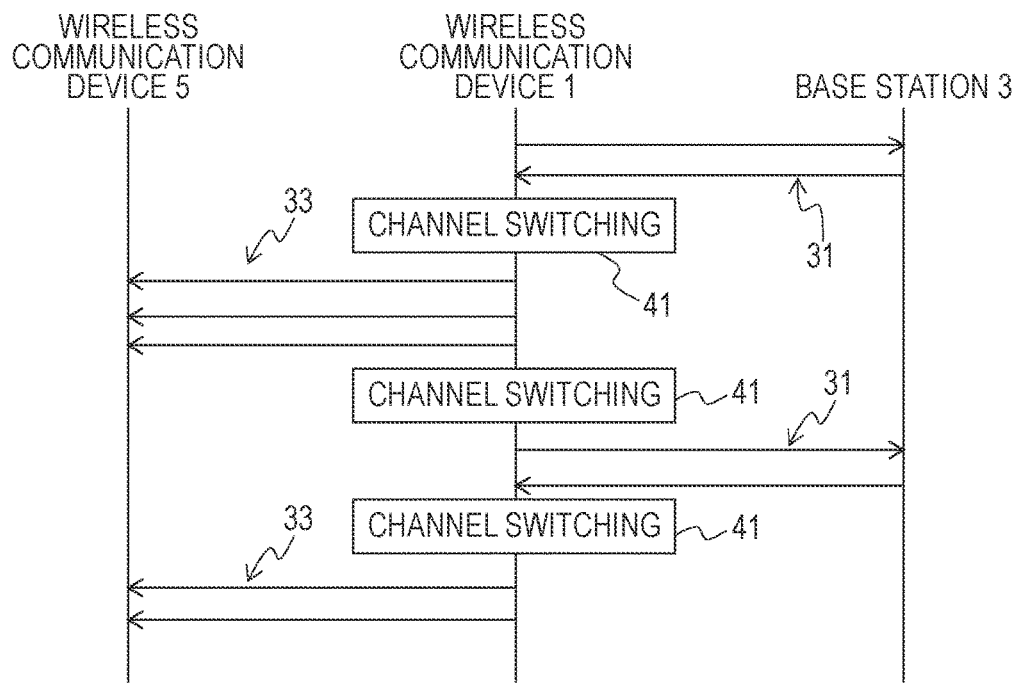
FIG. 5 is a diagram illustrating a comparative example of the communication sequence.

FIG. 5 is a diagram illustrating a comparative example of a communication sequence. FIG. 5 is a comparative example of the communication method in the embodiment. Such a comparative example illustrates a communication sequence between the wireless communication device 1, the base station 3, and the wireless communication device 5 that is the communication partner of the wireless communication device 1. The wireless communication device 1 performs STA mode communication 31 with the base station 3. In addition, the wireless communication device 1 performs direct communication with the wireless communication device 5 through a P2P mode communication 33. In such a comparative example, different wireless channels are used for the STA mode communication 31 and the P2P mode communication 33. In this case, it is desirable that the wireless communication device 1 executes processing of channel switching 41 when the communication is switched. The channel switching 41 includes, for example, switching processing between a carrier frequency used for the STA mode communication 31 and a carrier frequency used for the P2P mode communication 33 in the RF circuit of the transceiver 13.

In the example of FIG. 5, when the wireless communication device 1 performs the P2P mode communication while performing the STA mode communication, the following case is conceivable. For example, due to the specification or the like of the wireless communication device 5, the connection of the STA mode communication 31 is established using one of wireless channels in a 5 GHz band, and the connection of the P2P mode communication 33 is established using one of wireless channels in a 2.4 GHz band. In this case, the communication using one of the wireless channels in the 5 GHz band and the communication using one of the wireless channels in the 2.4 GHz band are performed so as to be switched by time division. When such channel switching 41 is performed, the wireless communication device 1 pauses the processing using one of the wireless channels in the 5 GHz band, and then executes the processing using one of the wireless channels in the 2.4 GHz band. During the time taken for such channel switching 41, the communication is not performed, thereby causing a reduction in data transfer efficiency. As described above, in the communication sequence in the comparative example, the processing becomes complicated by the channel switching 41, and a time loss in the communication is increased due to the time taken for the processing. However, as described in the communication method in the first embodiment, when the STA mode communication 7 and the P2P mode communication 9 are performed using an identical wireless channel, the channel switching 41 becomes unnecessary. Therefore, a time during which the communication is not performed due to the channel switching 41 does not occur.

As described above, the wireless communication device 1 according to the first embodiment performs, while performing the STA mode communication 7 with the base station 3, the P2P mode communication 9 with the wireless communication device 5, using an identical wireless channel. Therefore, when switching is performed between the STA mode communication 7 and the P2P mode communication 9, switching processing of a wireless channel is unnecessary. As a result, occurrence of a time during which the communication is not performed is suppressed, so that occurrence of a time loss at the time of switching of the communication is suppressed, and a reduction in the efficiency of data transmission and data reception in the wireless LAN is avoided. Therefore, data transfer and the like in the wireless communication system 10 are performed efficiently.

For example, in FIG. 5, the P2P mode communication 33 merely includes data transmission from the wireless communication device 1 to the wireless communication device 5, but the P2P mode communication 33 may include data transmission from the wireless communication device 5 to the wireless communication device 1, or include bidirectional data transmission.

Second Embodiment

A wireless communication device 20 according to a second embodiment is described below with reference to drawings. In the second embodiment, a wireless communication system includes the wireless communication device 20 instead of the wireless communication device 1 in the wireless communication system 10 in FIG. 1. In the description of the embodiment, the wireless communication device 20 performs, while performing the STA mode communication 7 with the base station 3, the P2P mode communication 9 with the wireless communication device 5 using an identical wireless channel. In the embodiment, a repeated description of a configuration and an operation similar to those of the first embodiment is omitted herein.

The wireless communication device 20 performs, for example, the STA mode communication 7 with the base station 3 and the P2P mode communication 9 with the wireless communication device 5 so as to perform switching between the STA mode communication 7 and the P2P mode communication 9 by time division. The wireless communication device 20 includes, for example, a multi-function mobile phone and various computers such as a tablet, notebook, and desktop computers each including a wireless transceiver.

Figure 6:
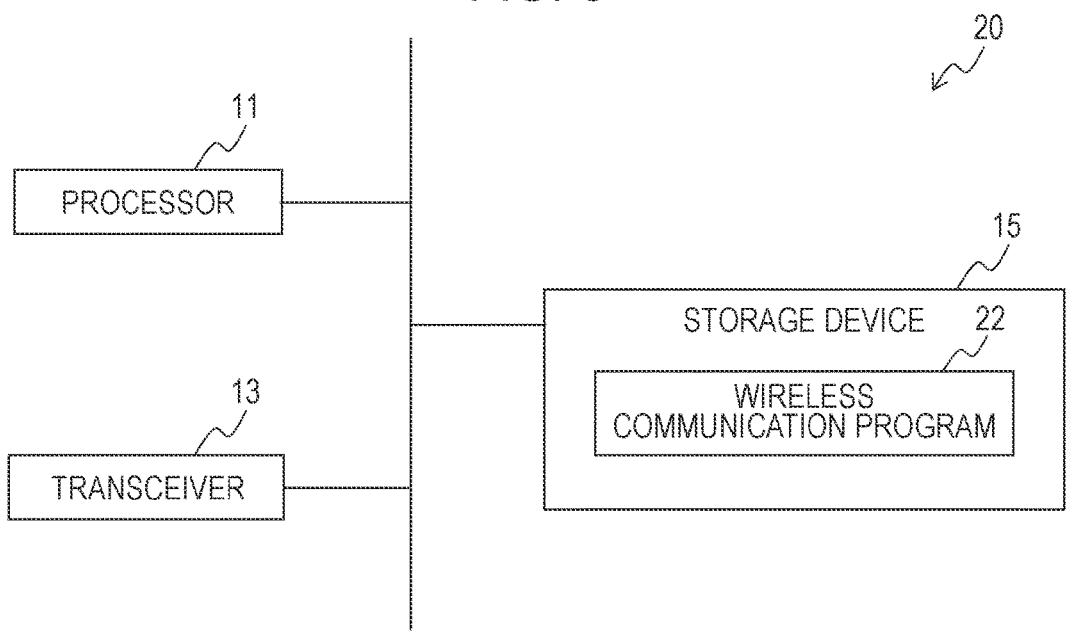
FIG. 6 is a diagram illustrating an example of a hardware configuration of a wireless communication device according to a second embodiment.

FIG. 6 is a diagram illustrating an example of a hardware configuration of the wireless communication device 20 according to the second embodiment. The wireless communication device 20 includes one or more processors 11, a transceiver 13, and a storage device 15. In the wireless communication device 20, the storage device 15 stores a wireless communication program 22. The one or more processors 11 execute various processing in the wireless communication method in the second embodiment, for example, by reading and executing the wireless communication program 22 that has been stored in the storage device 15 in advance. The wireless communication program 22 is used to control an operation of the wireless communication device 20.

Figure 7:
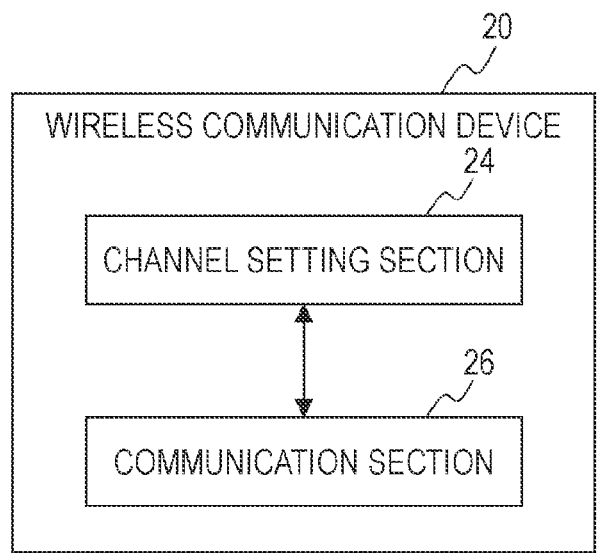
FIG. 7 is a block diagram illustrating an example of a function configuration of the wireless communication device according to the second embodiment.

FIG. 7 is a block diagram illustrating an example of a function configuration of the wireless communication device 20 according to the second embodiment. The wireless communication device 20 includes a channel setting section 24 and a communication section 26. When the connection in at least one of the wireless communications of the STA mode communication 7 and the P2P mode communication 9 has been established, the channel setting section 24 sets the wireless channel used for the other wireless communication to be the same wireless channel as the wireless channel being used for one wireless communication. The channel setting section 24 performs setting of a wireless channel, for example, by outputting channel information indicating a used wireless channel to the communication section 26. As the method of setting the wireless channel for the other wireless communication to be the wireless channel for one wireless communication, various methods are applied.

For example, the channel setting section 24 may search for a base station or a wireless communication device of a connection destination of the other wireless communication, for which a wireless channel of the wireless communication in which the connection has been established is allowed to be used, and may establish the connection with the found device. In addition, the channel setting section 24 may change the wireless channel used for one of the STA mode communication and the P2P mode communication, in which the connection has been already established, to the same wireless channel as used for the other wireless communication. In this case, the channel setting section 24 may change the wireless channel in the device of the connection destination with which the connection has been established, or may search for a further device other the connection destination. In this case, the communication in which the connection with the further device is established is an example of a third wireless communication.

The communication section 26 corresponds to the transceiver 13. The communication section 26 performs, for example, the STA mode communication 7 and the P2P mode communication 9 using an identical wireless channel that has been set in the channel setting section 24 so as to perform switching between the STA mode communication 7 and the P2P mode communication 9 by time division. The communication section 26 receives channel information indicating used wireless channel from the channel setting section 24, and sets a carrier frequency used when the RF circuit modulates a baseband signal into a wireless signal, at a frequency of the wireless channel indicated by the channel information. The channel setting section 24 is achieved, for example, by causing the one or more processors 11 to read and execute the wireless communication program 22. Some functions of the sections in the wireless communication device 20 may be configured by hardware such as an integrated circuit.

Figure 8:
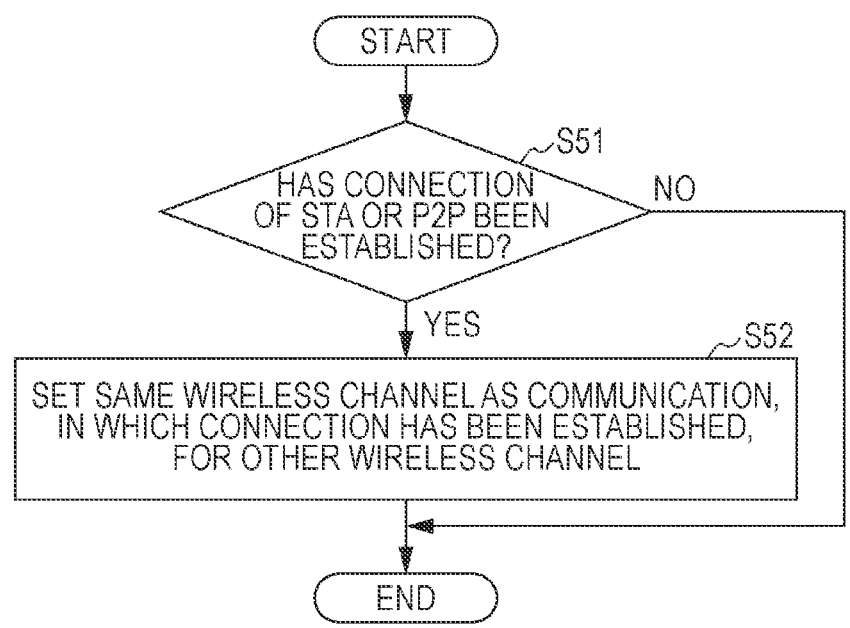
FIG. 8 is a flowchart illustrating an example of an operation of connection establishment processing according to the second embodiment.

FIG. 8 is a flowchart illustrating an example of an operation of connection establishment processing in the second embodiment. As illustrated in FIG. 8, the channel setting section 24 determines whether the connection of at least one of the STA mode communication and the P2P mode communication has been established (S51). The channel setting section 24 may determine whether the connection has been established, for example, with reference to connection information described later. The channel setting section 24 may determine whether the connection has been established, for example, based on the processing status of the communication section 26 or information on the connection state, which is included in a frame on which the transmission and reception is performed.

For example, when the connection of at least one of the STA mode communication 7 and the P2P mode communication 9 has been established (S51: YES), in the channel setting section 24, the flow proceeds to processing of S52. In S52, the channel setting section 24 causes a wireless channel used for the other communication to be matched with the wireless channel used for the communication in which the connection of one of the communications has been established. For example, the channel setting section 24 searches for a connection destination of the other wireless communication for which the wireless channel in the wireless communication in which the connection has been established is allowed to be used, and establishes the connection of the wireless communication with the found connection destination through the communication section 26. For example, when the connection of the STA mode communication 7 and the connection of the P2P mode communication 9 have been already established, and the used wireless channels are different from each other, the channel setting section 24 may execute processing in which one of the wireless channels is changed to the other wireless channel. The channel setting section 24 may release the connection of one of the wireless communication, and may establish the connection of wireless communication with the found communication partner different from the communication partner before the connection is released.

When any wireless communication is not established (S51: NO), in the channel setting section 24, the processing ends. When both of the wireless communications are not allowed to share an identical wireless channel in S52, the channel setting section 24 may not establish the connection of at least one of the wireless communications. In addition, when only the connection of one of the wireless communications has been established, in the channel setting section 24, the processing may end as is.

The above-described processing in the embodiment is executed, for example, when P2P mode communication with a wireless communication device of the communication partner is performed in an environment in which the infrastructure mode of a wireless LAN is available. In this case, it is assumed that the STA mode communication 7 has been performed, so that it is determined whether the connection of the STA mode communication 7 has been already established. In addition, the above-described processing is executed when the STA mode communication with the base station 3 is requested in the state in which the P2P mode communication with the wireless communication device of the communication partner has been performed. As a further example, the above-described processing is executed when execution of an application program is selected that includes processing in which the STA mode communication 7 and the P2P mode communication 9 are performed so as to be switched.

As described above, when the STA mode communication 7 with the base station 3 and the P2P mode communication 9 with the wireless communication device 5 are performed so as to be switched by time division, the wireless communication device 20 according to the second embodiment executes the following processing. When the connection of at least one of the STA mode communication 7 and the P2P mode communication 9 has been established, the wireless communication device 20 cause a wireless channel used for the other connection to be the same wireless channel used for one communication in which the connection has been established. That is, the wireless communication device 20 sets the wireless channel used for new communication to the same wireless channel as that used for the communication which is being performed already. Alternatively, the wireless communication device 20 resets a wireless channel used for one of the two wireless communications, in which the connection has been already established, to the same wireless channel used for the other communication. Alternatively, the wireless communication device 20 searches for a wireless communication device of the communication partner using the same wireless channel as one of the wireless communications, in which the connection has been established, and establishes the connection with the found wireless communication device. As a result, the STA mode communication 7 and the P2P mode communication 9 share an identical wireless channel. Therefore, when switching between the STA mode communication 7 and the P2P mode communication 9 is performed, switching processing of a wireless channel becomes unnecessary, so that occurrence of a time loss is suppressed. As a result, a reduction in the efficient of transmission and reception of data in the wireless LAN is avoided. As a method in which an identical channel is set for the two communications, various methods may be applied, so that the utilization of the communication method in the embodiment is increased.

Third Embodiment

A wireless communication device 70 according to a third embodiment is described below with reference to drawings. In the third embodiment, the same symbol is assigned to a configuration or an operation similar to that of the wireless communication device 1 according to the first embodiment and the wireless communication device 20 according to the second embodiment, and a repeated description is omitted herein. In the third embodiment, an example is described in which a wireless communication device 70 performs, while performing the STA mode communication 7 with the base station 3, the P2P mode communication 9 with the wireless communication device 5. The wireless communication device 70 may be an example of the wireless communication device 20.

Figure 9:
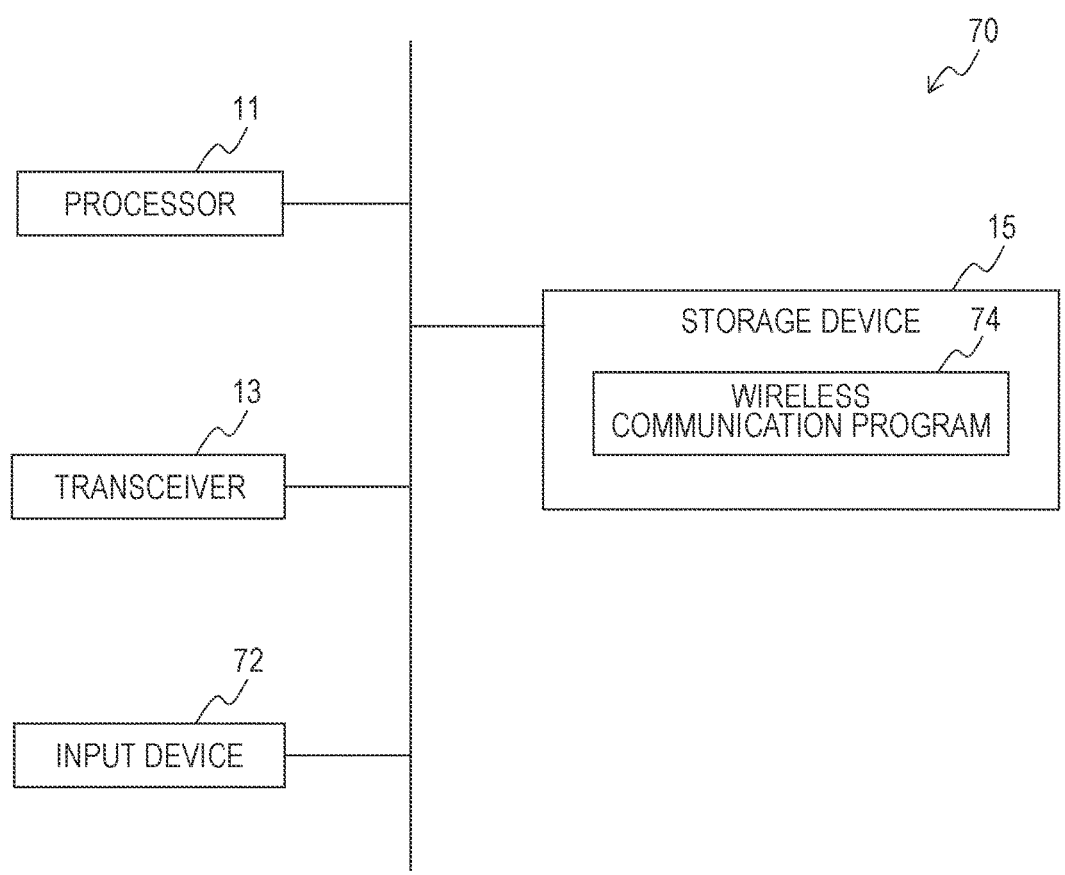
FIG. 9 is a diagram illustrating an example of a hardware configuration of a wireless communication device according to a third embodiment.

FIG. 9 is a diagram illustrating an example of a hardware configuration of a wireless communication device 70 according to the third embodiment. As illustrated in FIG. 9, the wireless communication device 70 includes one or more processors 11, a transceiver 13, a storage device 15, and an input device 72. When the wireless communication device 70 is operated by a user, the input device 72 obtains inputs of various pieces of information from the user, which are associated with the operation content, and transmits the obtained input information to the one or more processors 11. The input device 72 includes, for example, a keyboard device, a mouse device, and a touch panel. In the wireless communication device 70, the storage device 15 is, for example, a storage device in which reading is allowed to be performed, a storage device in which reading and writing are allowed to be performed at any time, or the like, and stores a wireless communication program 74. The wireless communication device 70 executes various processing, for example, by causing the one or more processors 11 to read and execute the wireless communication program 74. The wireless communication device 70 includes, for example, a multi-function mobile phone and various computers such as a tablet, notebook, and desktop computers each including a wireless transceiver.

Figure 10:
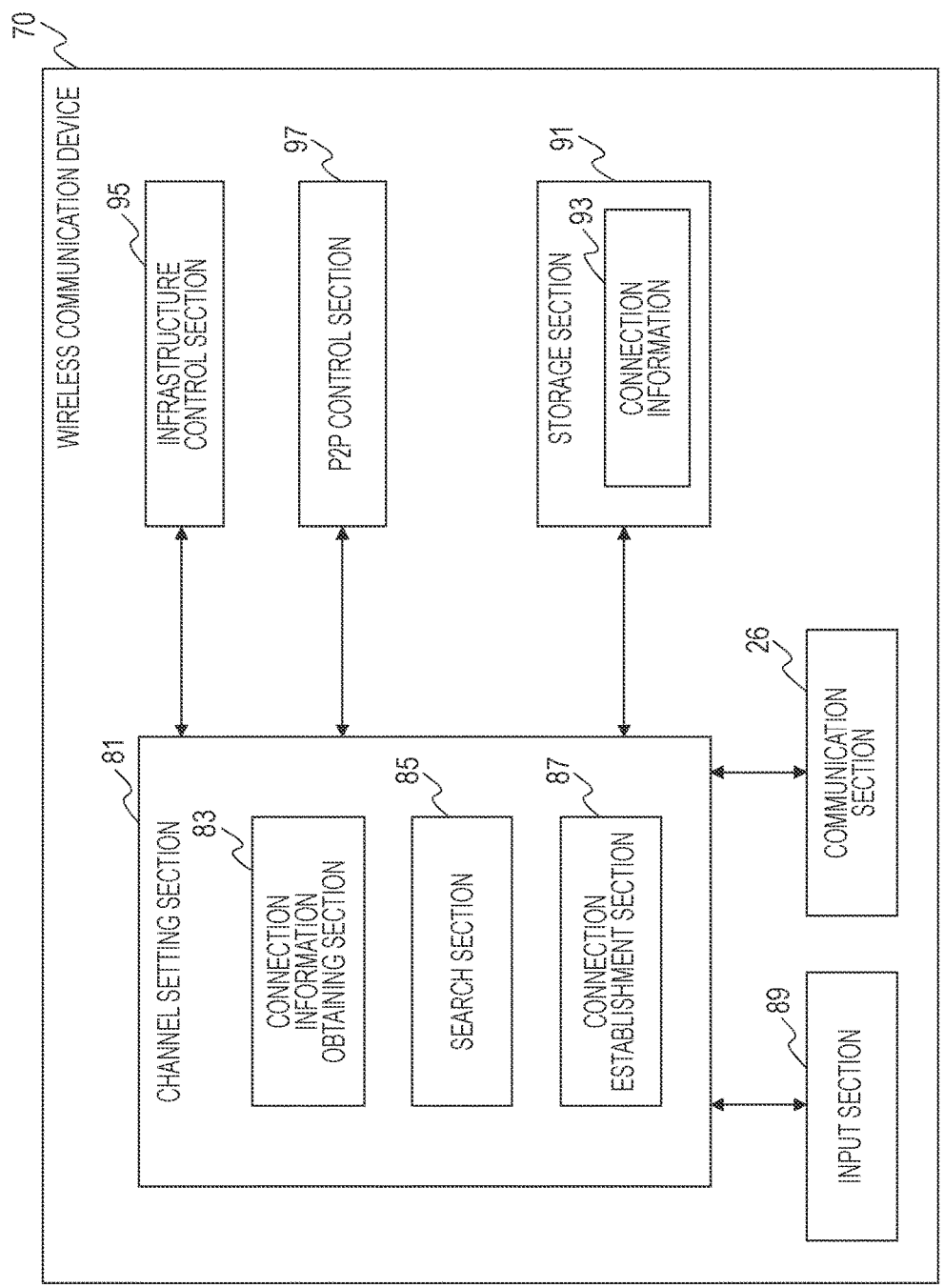
FIG. 10 is a block diagram illustrating an example of a function configuration of the wireless communication device according to the third embodiment.

FIG. 10 is a block diagram illustrating an example of a function configuration of the wireless communication device 70 according to the third embodiment. As illustrated in FIG. 10, the wireless communication device 70 includes a channel setting section 81, a communication section 26, a storage section 91, an infrastructure control section 95, and a P2P control section 97. The channel setting section 81 includes a connection information obtaining section 83, a search section 85, and a connection establishment section 87. The storage section 91 stores connection information 93.

For example, when the connection in at least one of the STA mode communication 7 and the P2P mode communication 9 has been established, the channel setting section 81 sets the wireless channel for the other wireless communication to be the same wireless channel as the wireless channel for one wireless communication. In the embodiment, an example is described in which, when the connection of STA mode communication has been established, the same wireless channel as the STA mode communication is set for the P2P mode communication.

The connection information obtaining section 83 obtains the connection information 93 stored in the storage section 91. The connection information 93 is information indicating the connection state of communication of the wireless communication device 70, but the detail is described later. In the embodiment, when the connection of the STA mode communication 7 has been established, channel information indicating a wireless channel used for the STA mode communication 7 is stored in the connection information 93.

The search section 85 searches for a wireless communication device of the communication partner for which the same wireless channel as the STA mode communication 7 is allowed to be used, and which is indicated by the channel information that has been obtained from the connection information 93 by the connection information obtaining section 83. The search method is described later. In the embodiment, the connection establishment section 87 executes processing in which the connection of communication with the wireless communication device that has been found by the search section 85 is established.

An input section 89 receives, for example, an input obtained from an operation by the user, through the input device 72. The storage section 91 is, for example, a storage device in which reading and writing are allowed to be performed at any time, and stores information desired when the wireless communication device 70 executes the processing so that reading and writing are allowed to be performed as appropriate. The storage section 91 stores the connection information 93. The connection information 93 is information on communication in which the connection has been established in the wireless communication device 70.

The infrastructure control section 95 controls the communication in the infrastructure mode of the wireless LAN. The P2P control section 97 controls terminal-to-terminal direct communication without an access point such as the base station 3, that is, the P2P mode communication 9 or the like between the wireless communication device 70 and the wireless communication device 5. The operations of the infrastructure control section 95 and the P2P control section 97 are scheduled, and the infrastructure control section 95 and the P2P control section 97 are operated sequentially. That is, the STA mode communication 7 controlled by the infrastructure control section 95 and the P2P mode communication 9 controlled by the P2P control section 97 are performed so as to be switched by time division.

The channel setting section 81, the infrastructure control section 95, and the P2P control section 97 of the wireless communication device 70 include functions achieved, for example, by causing the one or more processors 11 to read and execute the wireless communication program 74. The storage section 91 corresponds to the storage device 15. The input section 89 corresponds to the input device 72. Some functions in the wireless communication device 70 may be configured by hardware such as an integrated circuit.

Figures 11, 12:
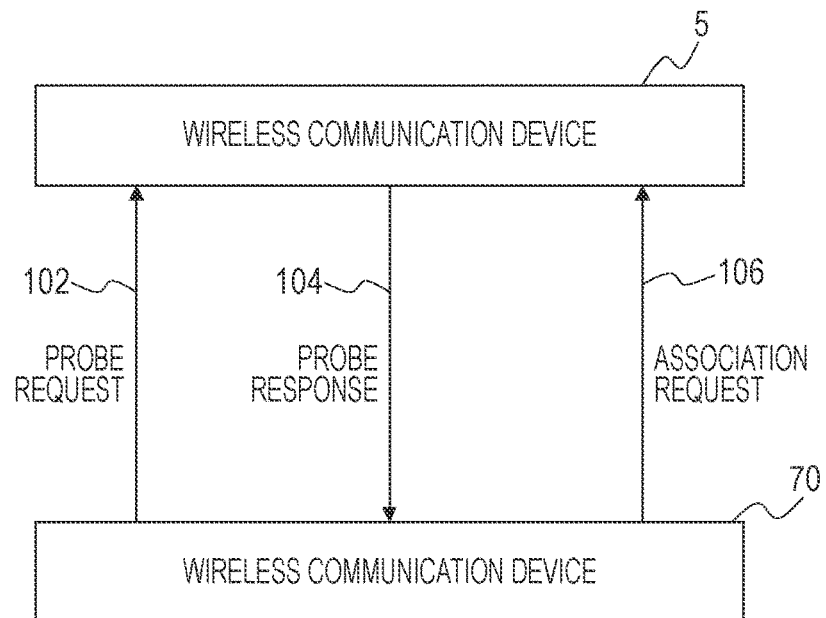
FIG. 11 is a diagram illustrating an example of connection information in the third embodiment.
FIG. 12 is a diagram illustrating an example of a search method of a wireless communication device of a connection destination, and a connection establishment method in the third embodiment.

FIG. 11 is a diagram illustrating an example of the connection information in the third embodiment. As illustrated in FIG. 11, the connection information 93 includes communication destination service set identification (SSID), a connection mode, a connection destination media access control (MAC) address, and channel information indicating a wireless channel. The connection information 93 is, for example, information on the wireless communication in which the connection has been currently established, and the information may be deleted when the connection is released. For example, the connection information 93 further includes a time at connection start and a time at disconnection of the communication, and the current connection condition may be determined with reference to the times. The connection information 93 is information referred to, for example, when the connection information obtaining section 83 obtains pieces of information on a connection mode and a wireless channel used for communication in which the connection has been established.

FIG. 12 is a diagram illustrating an example of a search method of a wireless communication device of the connection destination, and a connection establishment method according to the third embodiment. In the embodiment, the search section 85 searches for a connection destination in the P2P mode communication. As illustrated in FIG. 12, for example, when the connection between the wireless communication device 70 and the wireless communication device 5 has been established, transmission and reception of a probe request 102, a probe response 104, and an association request 106 are performed. The probe request 102 is a sign transmitted from the search section 85 through the P2P control section 97 when the connection information obtaining section 83 obtains information on a wireless channel used for the STA mode communication 7, and is broadcast using the obtained wireless channel. The probe response 104 is, for example, a signal transmitted to the wireless communication device 70 from the wireless communication device 5 that has received the probe request 102 as a response for the probe request 102. The association request 106 is, for example, a signal used when the connection establishment section 87 requests connection for the transmission source of the probe response 104 through the P2P control section 97. The connection establishment section 87 may further execute, for example, authentication processing and the like. As described above, the connection of the P2P mode communication is established. In this case, between the wireless communication device 70 and the wireless communication device 5, the communication is performed not through the base station 3, and the connection of the P2P mode communication 9 is established.

Figure 13:
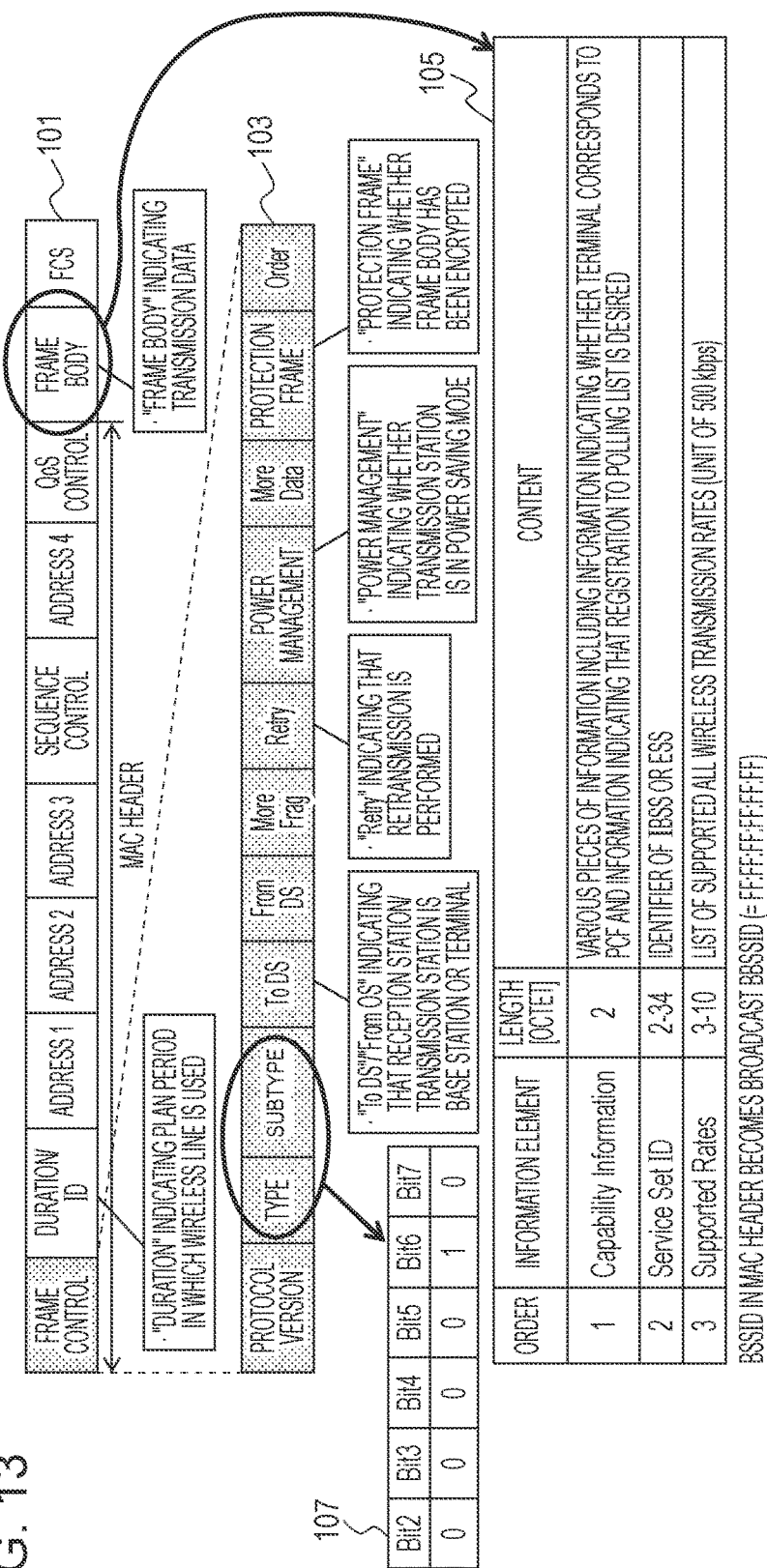
FIG. 13 is a diagram illustrating an example of a MAC frame format of a probe request of P2P connection in the third embodiment.

FIG. 13 is a diagram illustrating an example of a MAC frame format of the probe request 102 for the P2P connection in the third embodiment. As illustrated in FIG. 13, in a probe request format 101, in "type-subtype" 107 of frame control 103, the type of a frame is defined. The frame body of the probe request format 101 has a configuration, for example, illustrated in a frame body 105. For example, the wireless communication device 70 searches for a wireless communication device of the communication partner for which a wireless channel in the STA mode communication 7 in which the connection has been already established is allowed to be used by performing transmission of the probe request 102 matched with the probe request format 101. In this case, the probe request 102 is broadcasted. For example, when the same wireless channel as the probe request 102 is allowed to be used for the wireless communication device 5, the wireless communication device 5 generates the probe response 104 based on the received probe request 102 and transmits the probe response 104 to the wireless communication device 70.

Figure 14:
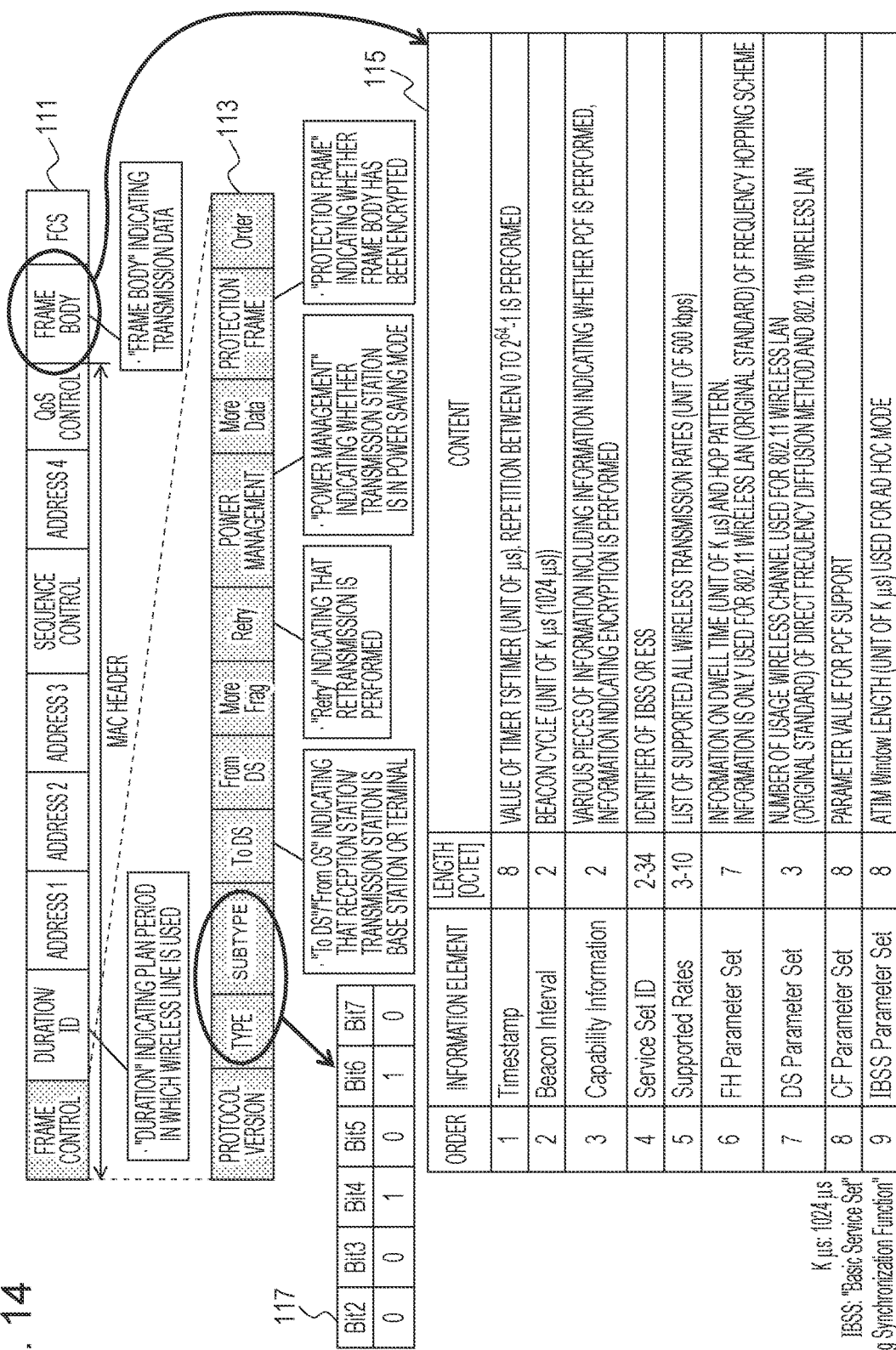
FIG. 14 is a diagram illustrating an example of a MAC frame format of a probe response of the P2P connection in the third embodiment.

FIG. 14 is a diagram illustrating an example of a MAC frame format of the probe response 104 of the P2P connection in the third embodiment. As illustrated in FIG. 14, in a probe response format 111, in "type-subtype" 117 of frame control 113, the type of a frame is defined. The frame body of the probe response format 111 has a configuration, for example, illustrated in a frame body 115. For example, the wireless communication device 5 notifies the wireless communication device 70 of information indicating that the connection using the wireless channel is allowed to be performed by performing transmission of the probe response 104 matched with the probe response format 111 using the wireless channel used for the STA mode communication 7.

Figure 15:
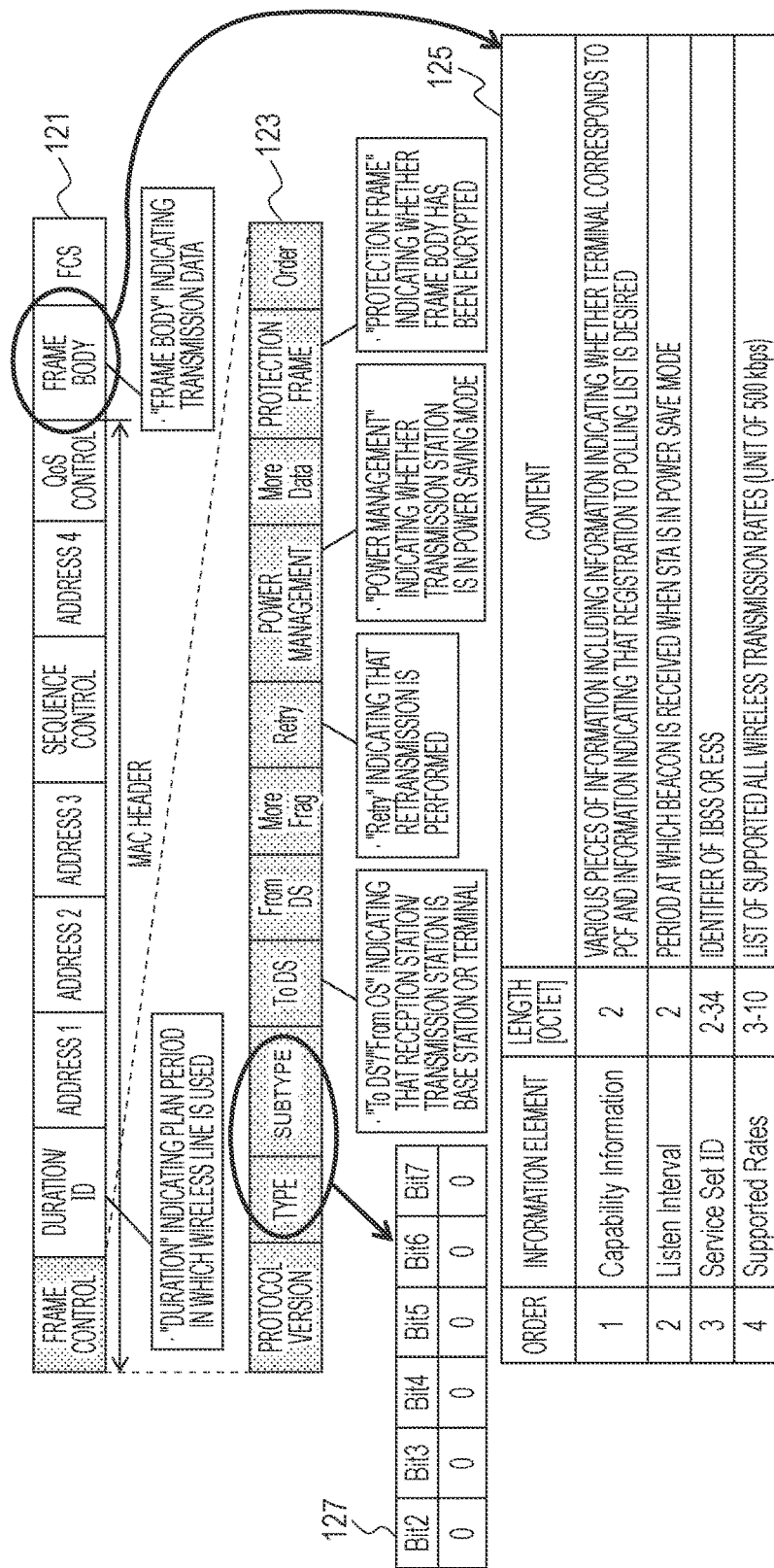
FIG. 15 is a diagram illustrating an example of a MAC frame format of an association request in the third embodiment.

FIG. 15 is a diagram illustrating an example of a MAC frame format of the association request 106 in the third embodiment. As illustrated in FIG. 15, in an association request format 121, in "type-subtype" 127 of frame control 123, the type of a frame is defined. The frame body of the association request format 121 has a configuration, for example, illustrated in a frame body 125. The wireless communication device 70 requests connection by wireless communication using the wireless channel for the wireless communication device 5, by performing transmission of the association request 106 matched with the association request format 121. The above-described MAC frame is an example, and a further example in which the similar operation is achieved may be employed.

Figure 16:
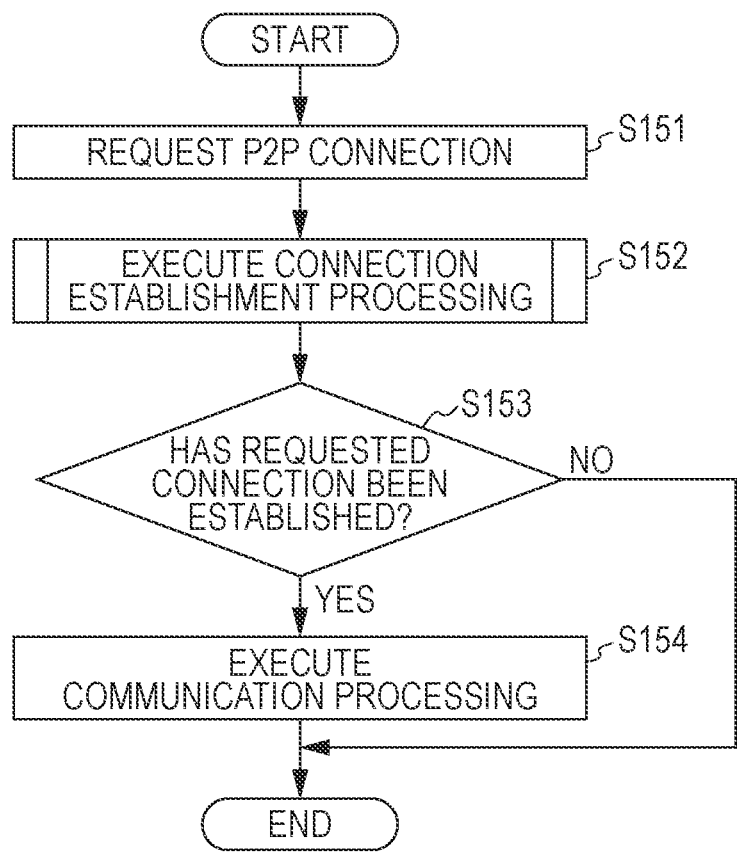
FIG. 16 is a flowchart illustrating an example of an operation of the wireless communication device according to the third embodiment.

An operation of the wireless communication device 70 according to the third embodiment is described below with reference to a flowchart. FIG. 16 is a flowchart illustrating an example of an operation of the wireless communication device 70 according to the third embodiment. As described above, in the third embodiment, the example is described in which the wireless communication device 70 requests the P2P connection.

As illustrated in FIG. 16, the channel setting section 81 receives a request of P2P connection through the input section 89 (S151). The channel setting section 81 executes connection establishment processing described later (S152). The channel setting section 81 determines whether the requested P2P connection has been established, and the processing ends when the connection is not established (S153: NO). When the connection has been established (S153: YES), the communication section 26 executes communication processing such as transmission and reception of desired data so that switching is performed between the STA mode communication 7 and the P2P mode communication 9 (S154), and the processing ends.

Figure 17:
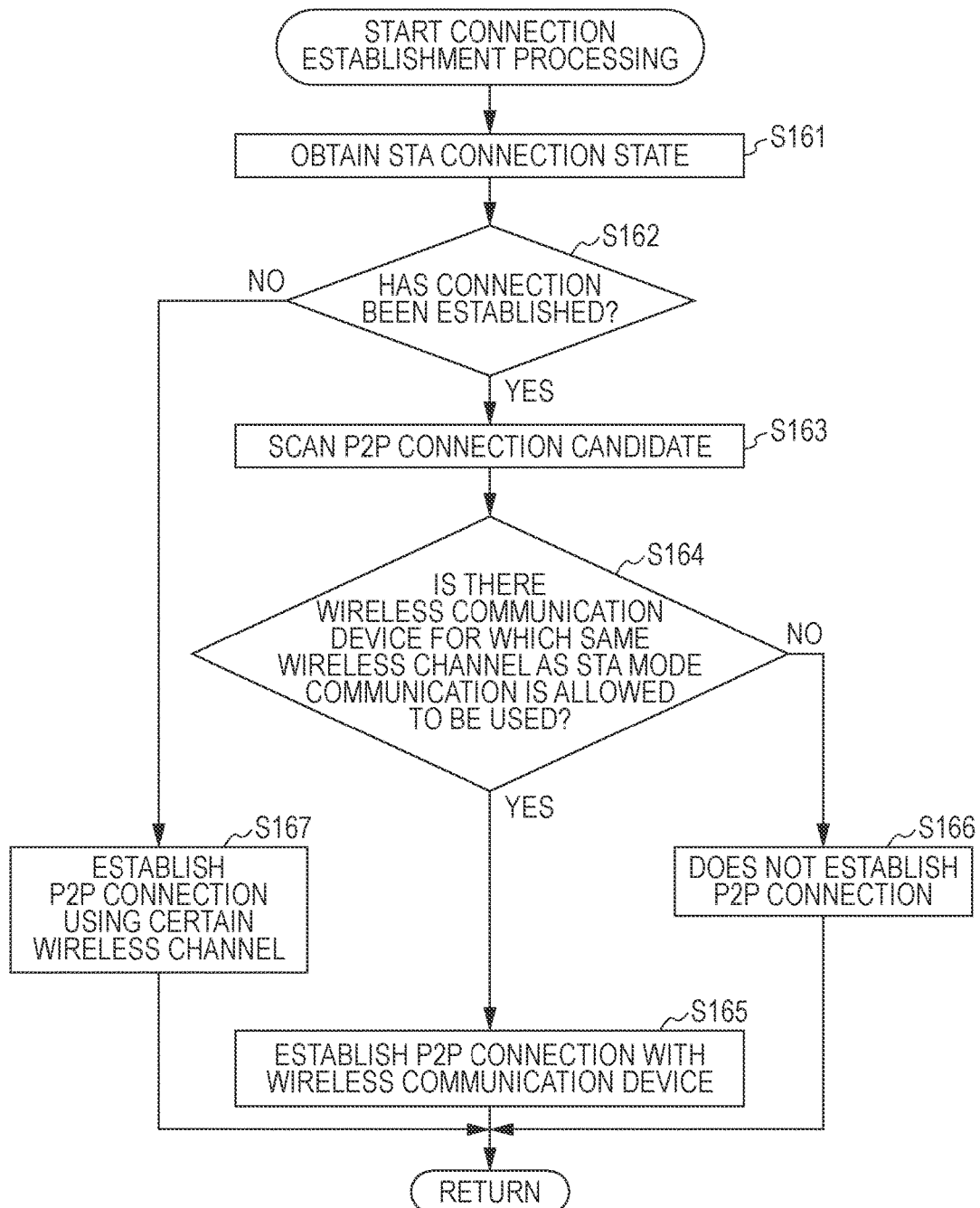
FIG. 17 is a flowchart illustrating an example of connection establishment processing in the third embodiment.

FIG. 17 is a flowchart illustrating an example of the connection establishment processing in S152 of FIG. 16 in the third embodiment. As illustrated in FIG. 17, the connection information obtaining section 83 of the channel setting section 81 obtains the communication state of STA mode communication, with reference to the connection information 93 stored in the storage section 91 (S161). The connection information obtaining section 83 determines whether the connection of STA mode communication has been established, based on the connection information 93 (S162). For example, when information on the STA mode communication 7 such as the connection information 93 is stored in the storage section 91, the connection information obtaining section 83 determines that the connection has been established (S162: YES). When the connection of STA mode communication is not established (S162: NO), the connection establishment section 87 may establish the connection of P2P mode communication using a desired wireless channel (S167), and the flow may return to the processing of FIG. 16, and the connection establishment section 87 may execute the processing.

When the connection of the STA mode communication has been established (S162: YES), the connection information obtaining section 83 obtains, for example, information indicating that a wireless channel corresponds to a 1 ch in 2.4 GHz, in the example of the connection information 93. The search section 85 of the channel setting section 81 scans, for example, a connectable P2P connection candidate using the wireless channel of the connected STA mode communication 7 (S163). The search section 85 transmits a probe request using the wireless channel used for the STA mode communication 7, the information of which is obtained from the connection information 93 by the connection information obtaining section 83. In this case, based on the instruction of the search section 85, for example, the P2P control section 97 generates a frame of the probe request format 101 described with reference to FIG. 13. The communication section 26 broadcasts the probe request 102, based on the generated frame of the probe request format 101.

The search section 85 determines whether there is a wireless communication device for which the same wireless channel as the STA mode communication 7 is allowed to be used, depending on whether the probe response 104 has been received (S164). When there is a wireless communication device for which the same wireless channel as the STA mode communication 7 is allowed to be used (S164: YES), the connection establishment section 87 establishes P2P connection with the transmission source of the probe response 104, for example, the wireless communication device 5 (S165). The connection establishment section 87 executes processing such as transmission of the association request 106 based on the association request format 121 generated by the P2P control section 97, to the found wireless communication device to establish the P2P connection. As described above, the establishment of the connection may be performed by the method described below with reference to FIGS. 12 to 15. In addition, in the connection establishment section 87, the flow returns to the processing of FIG. 16, and the connection establishment section 87 executes the processing. When there is no wireless communication device for which the same wireless channel as the STA mode communication 7 is allowed to be used (S164: NO), the connection establishment section 87 does not establish P2P connection (S166), and the flow returns to the processing of FIG. 16, and the connection establishment section 87 executes the processing.

As described above, in the wireless communication device 70 according to the third embodiment, when a P2P connection request is received, the connection information obtaining section 83 determines whether the connection of the STA mode communication has been established, with reference to the connection information 93. When the connection of the STA mode communication is not established, the connection establishment section 87 may establish P2P connection using a certain wireless channel such as a wireless channel that has been set in advance. When the connection of the STA mode communication has been established, the search section 85 searches for a wireless communication device with which the communication is performed using a wireless channel in the STA mode communication 7. In this case, the wireless communication device 70 broadcasts the probe request 102 using the wireless channel in the STA mode communication 7.

When the probe response 104 for the probe request 102 has been received, the connection establishment section 87 transmits an association request 106 to the transmission source of the probe response 104, and establishes, for example, the connection of the P2P mode communication 9 using the same wireless channel as the STA mode communication. When the probe response 104 is not received, the connection of the P2P mode communication is not established.

As described above, the wireless communication device 70 according to the third embodiment performs, while performing the STA mode communication 7 with the base station 3, the P2P mode communication 9 with the wireless communication device 5, using an identical wireless channel. When the connection of the STA mode communication 7 has been established, the channel setting section 81 searches for a wireless communication device 5 that is the communication partner for which the wireless channel in the STA mode communication 7 is allowed to be used, and establishes the connection of the P2P mode communication 9. In this case, the wireless communication device 70 performs, while performing the STA mode communication 7, the P2P mode communication 9 using the identical wireless channel, so that switching processing of a wireless channels becomes unnecessary. As a result, an increase in a time loss due to the wireless channel switching is suppressed. In the wireless communication device 70 according to the embodiment, for example, when the connection of the STA mode communication has been already established, the same wireless channel as the P2P mode communication may be set for a wireless channel used for the STA mode communication.

The function configuration illustrated in FIG. 10, the communication sequence illustrated in FIG. 12, the detailed MAC frame formats, the flowcharts illustrated in FIGS. 13 to 15, and the like, are not limited to the illustrated examples, and are included in the range of the embodiments as long as substantially the same operation is obtained.

Modification 1 of the Third Embodiment

The modification 1 of the third embodiment is described below. In the modification, the same symbol is assigned to a configuration or an operation similar to that of the first embodiment to the third embodiment, and a repeated description is omitted herein. The modification is a modification of the setting method of a wireless channel in the example in which the wireless communication device 70 according to the third embodiment performs, while performing the STA mode communication 7 with the base station 3, the P2P mode communication 9 with the wireless communication device 5. The modification is an example in which the same wireless channel as the STA mode communication is set for the P2P mode communication when the connection of P2P mode communication has been established. That is, in the modification, the wireless communication device 70 obtained a wireless channel used for the P2P mode, searches for a base station 3 for which the obtained wireless channel is allowed to be used, and establishes the connection of the STA mode communication 7 with the base station 3.

Figure 18:
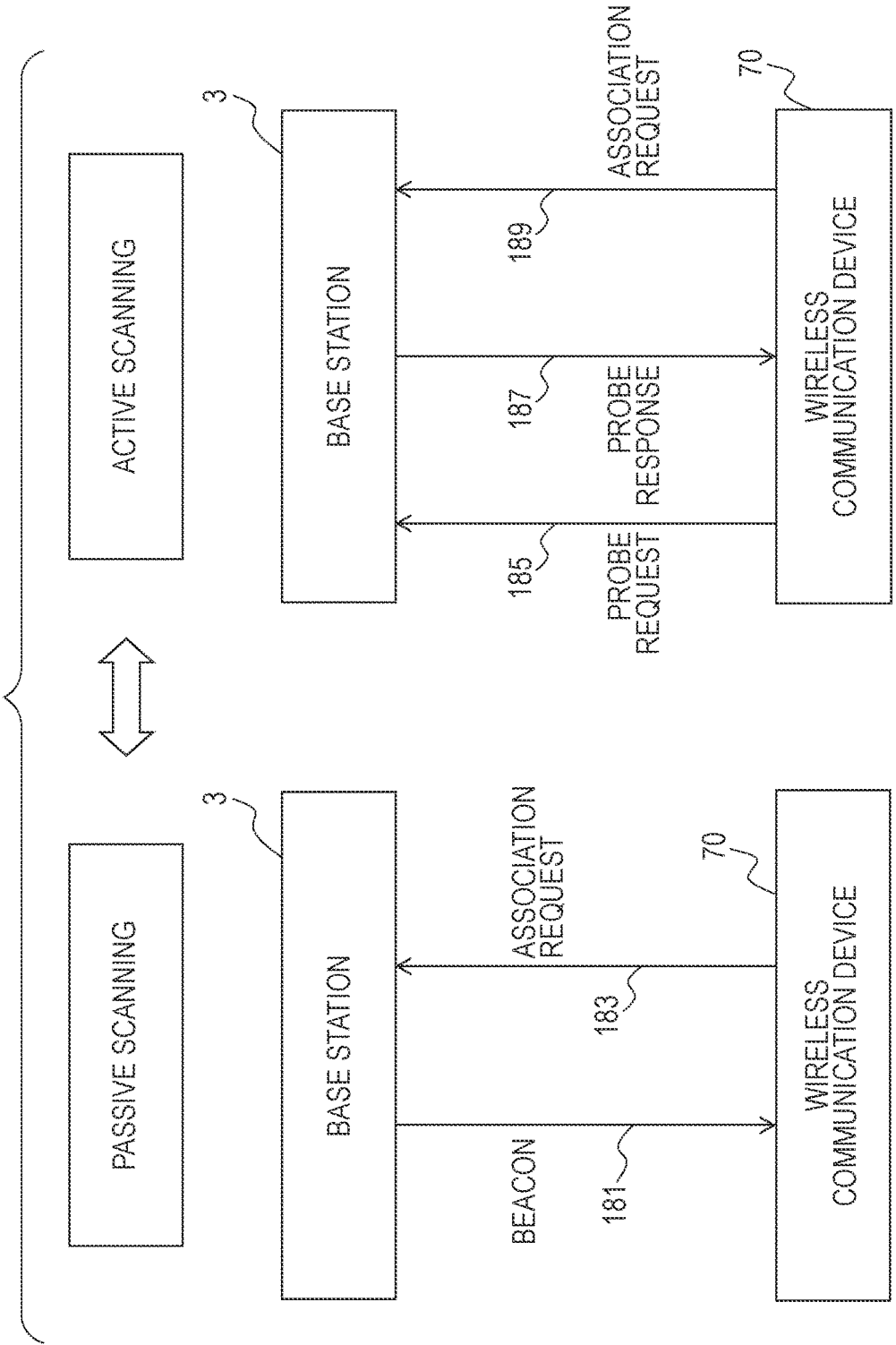
FIG. 18 is a diagram illustrating an example of a search method of a base station that is a connection destination and connection establishment method in a modification 1 of the third embodiment.

FIG. 18 is a diagram illustrating an example of a search method of a base station that is the connection destination and a connection establishment method in the modification 1 of the third embodiment. In the modification, the search section 85 searches for a connection destination of the STA mode communication for which a wireless channel in the P2P mode communication in which the connection has been already established is allowed to be used. When the connection destination of the STA mode communication has been found, as illustrated in FIG. 18, the search section 85 may use either of active scanning and passive scanning. In the passive scanning, the wireless communication device 70 searches for a beacon transmitted from the base station. An example of the beacon and an example of the sequence at the time of the searching are described later.

For example, when the connection between the wireless communication device 70 and the base station 3 has established, transmission and reception of a beacon 181 and an association request 183 are performed. The beacon 181 is signal that is a communication sign, for example, used to notify the wireless communication device of the existence of the base station 3 and information on an available connection by the base station 3, and is, for example, broadcast. The association request 183 is a signal used to request connection for the transmission source when the wireless communication device 70 has received the beacon 181. In the passive scanning, as described later, for example, the wireless communication device 70 receives beacons at a plurality of available wireless channels, and selects a wireless channel from the received beacons.

In the active scanning, transmission and reception of a probe request 185, a probe response 187, and an association request 189 are performed. When the connection information obtaining section 83 of the wireless communication device 70 obtains a wireless channel in the P2P mode communication 9, the probe request 185 is transmitted using the obtained wireless channel. The probe request 185 is transmitted, for example, through the infrastructure control section 95 and the communication section 26 by the search section 85. The probe response 187 is, for example, a signal used to notify the wireless communication device 70 of the existence of the base station 3 that has received the probe request 185 by the base station 3, as a response for the probe request 185. The association request 106 is a signal used to request the connection for the transmission source of the probe response 187, for example, through the infrastructure control section 95, by the connection establishment section 87. In the connection establishment processing, the wireless communication device 70 may execute authentication processing and the like, in addition to the above-described processing.

Figure 19:
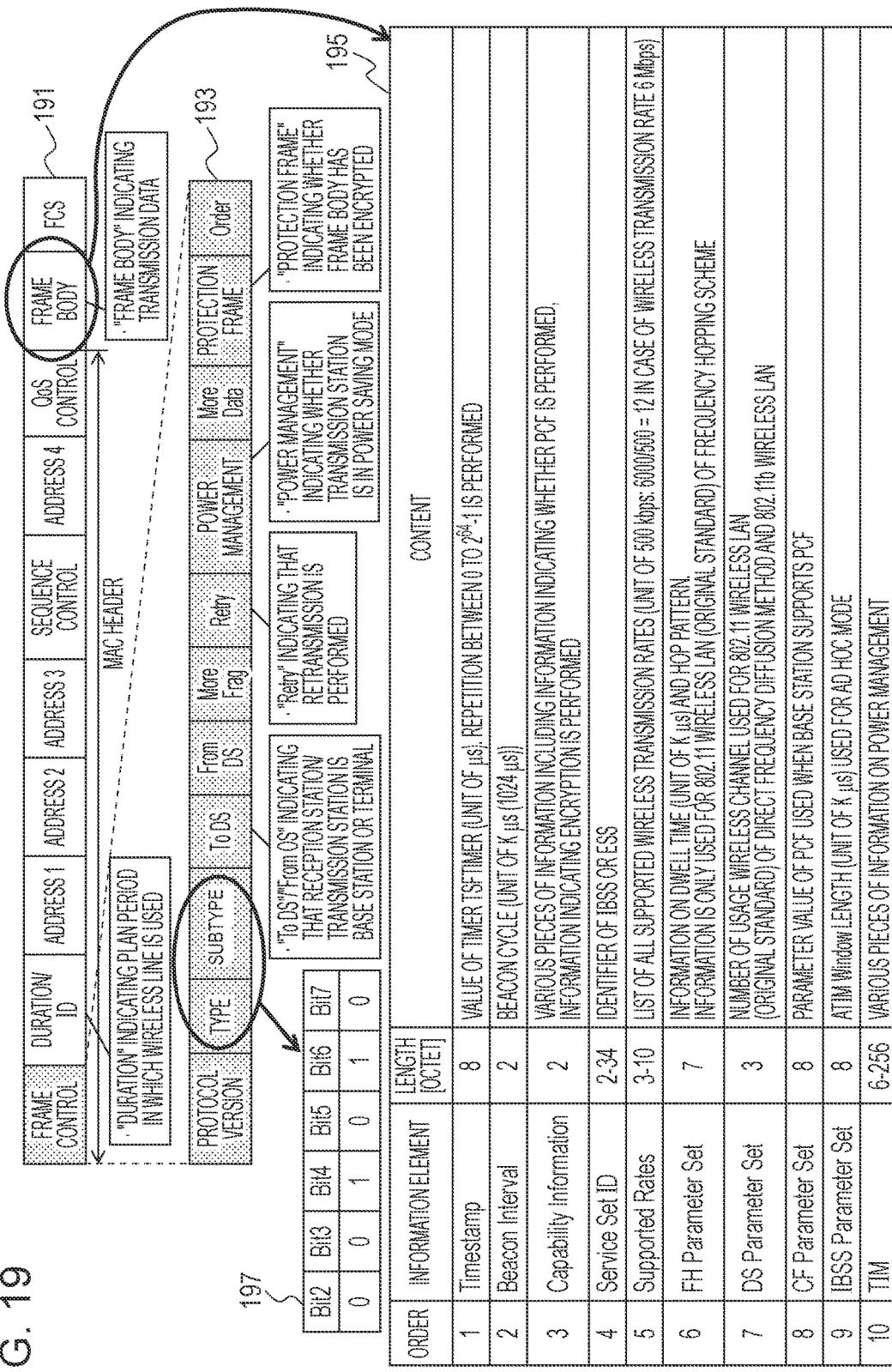
FIG. 19 is a diagram illustrating an example of a MAC frame format of a beacon for STA connection in the modification 1 of the third embodiment.

FIG. 19 is a diagram illustrating an example of a MAC frame format of the beacon of STA connection in the modification 1 of the third embodiment. As illustrated in FIG. 19, in a beacon format 191, in "type-subtype" 197 of frame control 193, it is defined that the type of a frame is a beacon. The frame body of the beacon format 191 has a configuration, for example, illustrated in a frame body 195. For example, the base station 3 notifies the wireless communication device 70 of information indicating that the connection using the wireless channel is allowed to be performed, by transmitting the beacon 181 corresponding to the beacon format 191. Here, the beacon 181 is broadcasted.

Figure 20:
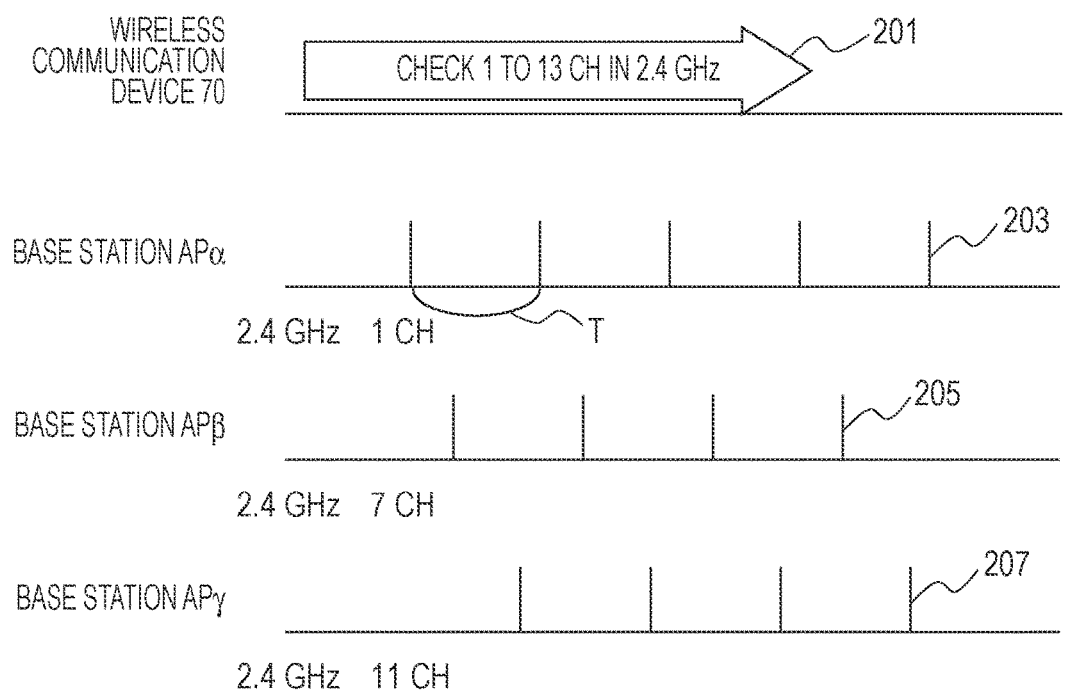
FIG. 20 is a diagram illustrating an example of scanning of a connection candidate in an STA mode in the modification 1 of the third embodiment.

FIG. 20 is a diagram illustrating an example of scanning of a connection candidate in an STA mode by the wireless communication device 70 according to the modification 1 of the third embodiment. The example of FIG. 20 corresponds to scanning in the passive scanning. As illustrated in FIG. 20, the wireless communication device 70 receives beacon signals, for example, in a 1 ch to 13 ch of the 2.4 GHz band. It is assumed that base stations APα to APγ exits in the range in which the wireless communication device 70 may receive the beacon signals, and respectively transmit beacons 203, 205, and 207 at certain time intervals T. For example, a wireless channel of the base station APα corresponds to the 1 ch in "2.4 MHz". A wireless channel of the base station APβ corresponds to the 7 ch in "2.4 MHz". A wireless channel of the base station APγ corresponds to the 11 ch in "2.4 MHz". In this case, as a result of the searching, the wireless communication device 70 receives three types of the beacons 203, 205, and 207. When there is the same wireless channel as used for the P2P mode communication 9 in which the connection has been already established, in the three types of the beacons 203, 205, and 207, the wireless communication device 70 transmits the association request 183 to the transmission source of the beacon of the same wireless channel.

Figure 21:
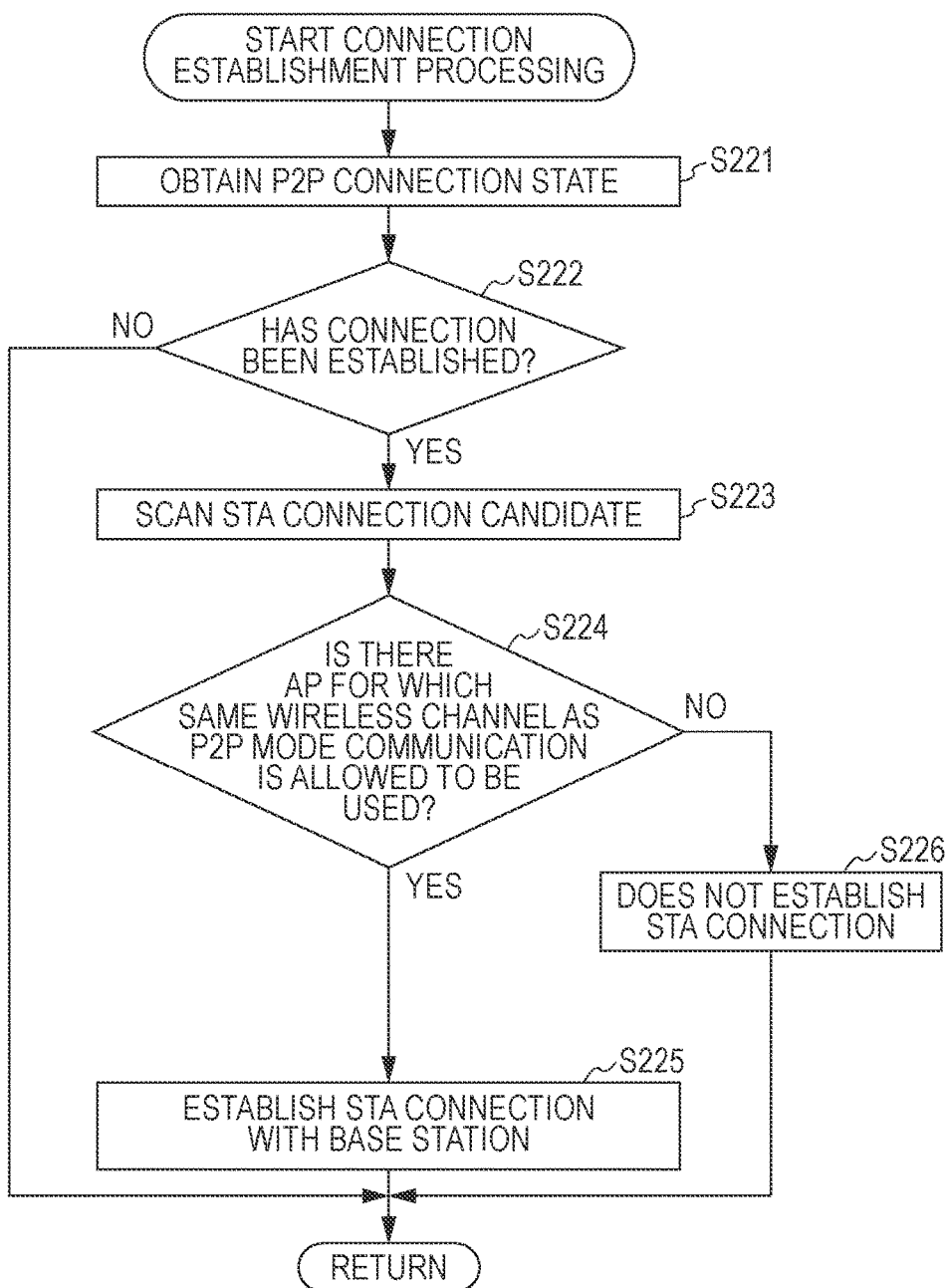
FIG. 21 is a flowchart illustrating an example of connection establishment processing in the modification 1 of the third embodiment.

The connection establishment processing in the embodiment is described below in detail with reference to a flowchart. FIG. 21 is a flowchart illustrating an example of the connection establishment processing in the modification 1 of the third embodiment. FIG. 21 illustrates the connection establishment processing when a connection request of the STA mode communication is issued instead of the connection request of the P2P mode communication in the processing in FIG. 16. In this case, in the processing of FIG. 16, it is assumed that the connection request of the STA mode communication is issued instead of the processing of S151.

As illustrated in FIG. 21, the connection information obtaining section 83 of the channel setting section 81 obtains the connection state of the P2P mode, with reference to the connection information 93 stored in the storage section 91 (S221). The connection information obtaining section 83 determines whether the connection of the P2P mode communication has been established, based on the connection information 93 (S222). For example, when information on the P2P mode communication 9 is stored in the storage section 91, the connection information obtaining section 83 determines that the connection of the communication has been established (S222: YES). When the connection of the P2P mode communication is not established (S222: NO), the connection information obtaining section 83 ends the connection establishment processing.

When the connection of the P2P mode communication has been established (S222: YES), the search section 85 of the channel setting section 81 scans an STA connection candidate for which a wireless channel in the P2P mode communication 9 in which the connection has been established is allowed to be used (S223). The scanning is performed, for example, by the method described with reference to FIGS. 18 to 20. That is, the search section 85 performs the searching by the passive scanning or the active scanning.

In the passive scanning, the search section 85 determines whether a beacon in the wireless channel in the P2P mode communication 9 has been found. In the active scanning, the search section 85 determines whether the probe response 187 for the probe request 185 has been received (S224).

When the base station 3 for which the same wireless channel as the wireless channel in the P2P mode communication 9 is allowed to be used has been found (S224: YES), the connection establishment section 87 establishes the STA connection of the found base station 3 (S225). For example, the connection establishment section 87 executes processing in which the association request 183 or the association request 189 based on the generated frame is transmitted to the found base station 3, through the infrastructure control section 95 and the communication section 26 to establish the STA connection. When there is no available base station (S224: NO), the connection establishment section 87 ends the connection establishment processing without establishment of the STA connection (S226).

As described above, in the wireless communication device 70 according to the modification 1 of the third embodiment, when an STA connection request has been received, the connection information obtaining section 83 determines whether the connection of the P2P mode communication has been established, with reference to the connection information 93. When the connection of the P2P mode communication is not established, the connection establishment section 87 does not establish the STA connection. When the P2P mode communication has been established, the search section 85 searches for a base station for which a wireless channel in the P2P mode communication is allowed to be used. In this case, the wireless communication device 70 performs the passive scanning or the active scanning.

When the corresponding beacon 181 or probe response 187 has been received, the connection establishment section 87 transmits the association request 183 or the association request 189 to the transmission source. The connection establishment section 87 establishes the connection of the STA mode communication 7 with the base station 3 using the same wireless channel as the P2P mode communication 9. When a base station for which the same wireless channel is allowed to be used is not found, the connection of the STA mode communication is not established.

As described above, the wireless communication device 70 according to the modification 1 of the third embodiment performs, while performing the STA mode communication 7 with the base station 3, the P2P mode communication 9 with the wireless communication device 5, using an identical wireless channel. In the modification, for example, the channel setting section 81 sets the same wireless channel as the P2P mode communication 9 in which the connection has been established, for the STA mode communication. The connection establishment section 87 establishes the connection of the STA mode communication 7 using the wireless channel. Therefore, the wireless communication device 70 performs, while performing the STA mode communication 7, the P2P mode communication 9 using an identical wireless channel, so that the switching processing of a wireless channel is unnecessary. As a result, occurrence of a time loss due to the channel switching is suppressed. In the modification, in the case in which the P2P mode communication 9 has been already established, both of the STA mode communication 7 and the P2P mode communication 9 may be performed using an identical wireless channel.

The communication sequence illustrated in FIG. 18, the detailed MAC frame format illustrated in FIG. 19, the flowchart illustrated in FIG. 21, and the like, are not limited to the illustrated examples, and are included in the range of the embodiments as long as substantially the same operation is obtained.

Modification 2 of the Third Embodiment

A modification 2 of the third embodiment is described below. In the modification, the same symbols is assigned to a configuration or an operation similar to that of the first embodiment to the third embodiment, and the modification 1 of the third embodiment, and a repeated description is omitted herein. The modification is a modification of the setting method of a wireless channel in the example in which the wireless communication device 70 according to the third embodiment performs, while performing the STA mode communication 7 with the base station 3, the P2P mode communication 9 with the wireless communication device 5. The modification is an example in which the same wireless channel as the P2P mode communication is set for the STA mode communication when the connection of the STA mode communication and the connection of the P2P mode communication have been established. In the modification, a case is described in which a plurality of base stations 3-1 to 3-n and a plurality of wireless communication devices 5-1 to 5-m exist within a range in which the wireless communication device 70 may perform the communication, as an example.

FIG. 22 is a diagram illustrating an example of a wireless communication system including a wireless communication device 70 according to the modification 2 of the third embodiment. As illustrated in FIG. 22, a wireless communication system 230 includes the wireless communication device 70, the plurality of base stations 3-1 to 3-n, and the plurality of wireless communication devices 5-1 to 5-m. In the wireless communication system 230, at least, the wireless communication device 70 and the base station 3 communicate with each other wirelessly, and the wireless communication device 70 and the wireless communication device 5 also communicate with each other wirelessly. Here, "n" and "m" are integers of 1 or more.

The plurality of base stations 3-1 to 3-n are respectively wireless LAN access points. The plurality of wireless communication devices 5-1 to 5-m are respectively wireless communication devices each may perform P2P connection with at least other wireless communication devices. Hereinafter, one or more of base stations from among the plurality of base stations 3-1 to 3-n may be referred to as the base station 3. In addition, hereinafter, one or more of wireless communication devices from among the plurality of wireless communication devices 5-1 to 5-m may be referred to as the wireless communication device 5.

As described above, the wireless communication device 70 is a wireless communication device that performs, while performing the STA mode communication with the base station, the P2P mode communication that is the direct communication with a wireless communication device of the communication partner, using an identical wireless channel. In the modification, when the connection of the STA mode communication between the wireless communication device 70 and one of the base stations 3 has been established, the connection of the P2P mode communication with one of the wireless communication devices 5 is established using a certain wireless channel. When an identical wireless channel is not used for the STA mode communication and the P2P mode communication, the wireless communication device 70 searches for a base station 3 for which the same wireless channel as the P2P mode communication is allowed to be used. When the communication partner of the STA mode communication in which the connection has been established before the searching is allowed to use the wireless channel in the P2P mode communication 9, the channel of the communication partner is changed. When the base station 3 in which the STA mode communication has been performed before the searching does not use the wireless channel, the wireless communication device 70 may establish the connection of wireless communication with a base station 3, which is different from that of the base station 3 before the searching. As described above, the base stations 3 that are the communication partners before and after the searching may not be identical.

FIG. 23 is a diagram illustrating an example of connection information 228 in the modification 2 of the third embodiment. As illustrated in FIG. 23, the connection information 228 indicates the communication of the 1 ch in 2.4 GHz in the STA mode and the communication of the 11 ch in 2.4 GHz in the P2P mode are performed. Such connection information 228 is an example of connection information in the state in which the wireless communication device 70 has established the connection of the STA mode communication with one of the base stations 3 and the connection of the P2P mode communication with one of the wireless communication devices 5. In such an example, the connection information obtaining section 83 of the wireless communication device 70 obtains information indicating that the connection of the STA mode communication and the connection of the P2P mode communication have been established using different wireless channels, with reference to the connection information 228.

Figure 24:
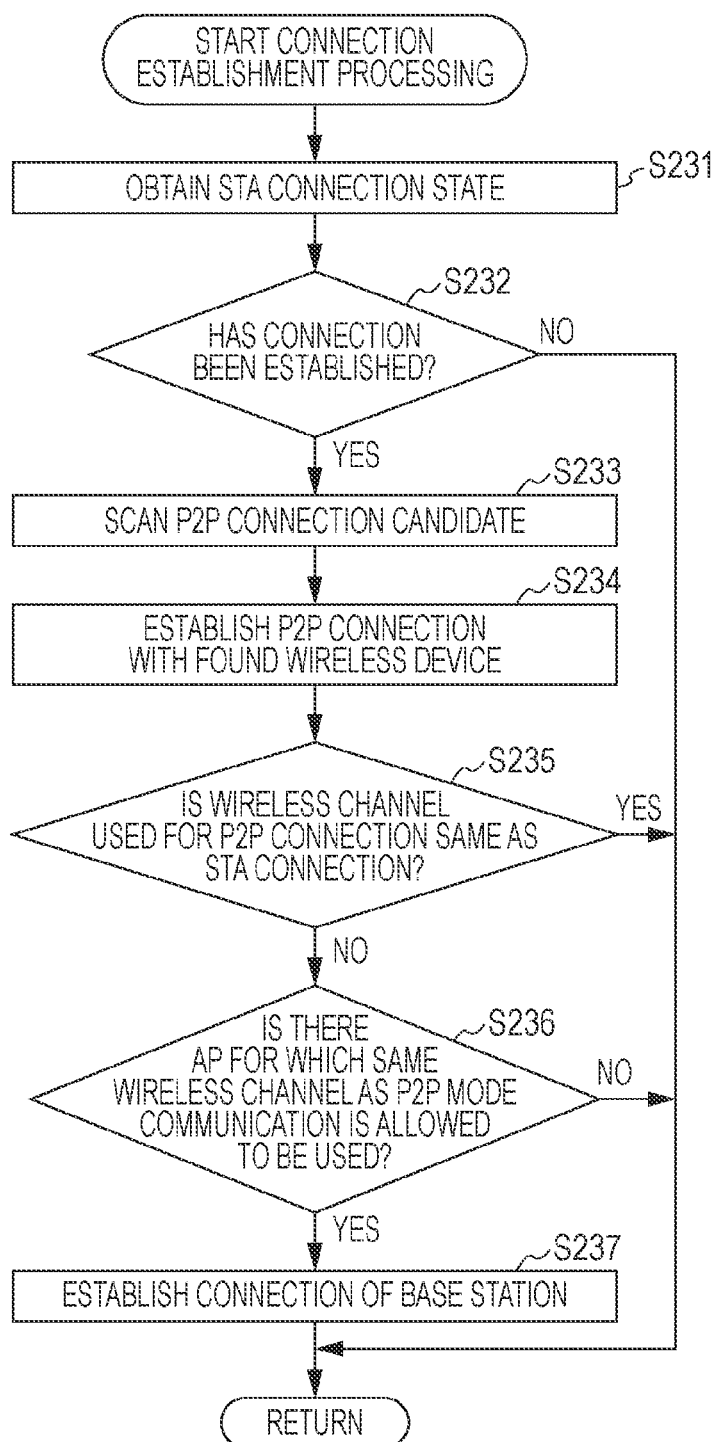
FIG. 24 is a flowchart illustrating an example of connection establishment processing in the modification 2 of the third embodiment.

The connection establishment processing in the embodiment is described below in detail with reference to a flowchart. FIG. 24 is a flowchart illustrating an example of the connection establishment processing in the modification 2 of the third embodiment. Such processing is, for example, an example of the connection establishment processing executed in S152 of FIG. 16. The modification is described using an example in which the connection of the P2P mode communication is request. As illustrated in FIG. 24, the connection information obtaining section 83 of the channel setting section 81 obtains the connection state of the STA mode, with reference to the connection information 228 stored in the storage section 91 (S231). The connection information obtaining section 83 determines whether the connection of the STA mode communication has been established, based on the connection information 228 (S232). FIG. 23 illustrates, as an example, the connection information 228 in the state in which both of the connection of the STA mode communication 7 and the connection of the P2P mode communication 9 have been established. In S232, when the P2P mode communication is not performed yet, it is assumed that the connection information 228 stores, for example, information such as the connection information 93.

For example, when the connection information 228 stores information on the STA mode communication, the connection information obtaining section 83 determines that the connection of the STA mode communication has been established (S232: YES). When the connection of the STA mode communication is not established (S232: NO), in the connection information obtaining section 83, the flow proceeds to the processing of FIG. 16, and the connection information obtaining section 83 executes the processing.

When the connection of the STA mode communication has been established (S232: YES), the search section 85 of the channel setting section 81 scans a connectable P2P connection candidate (S233). The scanning is performed, for example, by the active scanning described with reference to FIGS. 12 to 15. In this case, the search section 85 transmits the probe request 102, for example, using a wireless channel that has been set in advance, for example, regardless of the STA mode communication in which the connection has been already established.

When a wireless communication device 5 that is the communication partner using the wireless channel that has been set in advance is found by the search section 85, the connection establishment section 87 establishes the connection of the P2P mode communication 9 with the found wireless communication device 5 (S234). For example, in this case, information on the P2P mode communication is written onto the connection information 228. The connection information obtaining section 83 determines whether an identical wireless channel is used for the established P2P connection and the STA connection, with reference to the connection information 228 (S235). When an identical wireless channel is used (S235: YES), the flow returns to the processing of FIG. 16, and the wireless communication device 70 executes the processing.

When different wireless channels are respectively used (S235: NO), the search section 85 checks whether there is a base station 3 using the same wireless channel as the P2P mode communication 9 (S236). In this case, the scanning may correspond to the active scanning or the passive scanning. When there is no base station using the same wireless channel (S236: NO), in the search section 85, the flow proceeds to the processing of FIG. 16, and the search section 85 executes the processing.

When there is a base station using the same wireless channel (S236: YES), the connection establishment section 87 establishes the connection of the STA mode communication 7 with one of the base stations 3, which uses the same wireless channel as the P2P mode communication 9 (S237), and the flow returns to the processing of FIG. 16. When a base station in which the connection has been already established is allowed to use the wireless channel in the P2P mode communication 9, the wireless channel may be changed. The wireless communication with the base station 3 that is different from the base station before the searching and uses the same wireless channel as the P2P mode communication 9 is an example of the third wireless communication. When the connection of the third wireless communication is established, the connection establishment section 87 releases the connection that has been already established and establishes the connection of the third wireless communication.

As described above, in the modification, when the connection of the STA mode communication has been established, the connection of the P2P mode communication 9 is established using a certain wireless channel. After the connection of the STA mode communication and the connection of the P2P mode communication have been established, when it is determined that an identical wireless channel is not used, based on the connection information 228, the connection of the STA mode communication 7 with the base station 3 using the same wireless channel is established. A communication partner of the wireless communication in which the connection is established after the searching may be different from the base station 3 that is the communication partner before the searching.

As described above, the wireless communication device 70 according to the modification 2 of the third embodiment performs, while performing the STA mode communication 7 with the base station 3, the P2P mode communication 9 with the wireless communication device 5, using an identical wireless channel. In the modification, for example, the channel setting section 81 establishes the connection of the STA mode communication using the same wireless channel as the P2P mode communication 9. Therefore, in the wireless communication device 70, while performing the STA mode communication 7, the P2P mode communication 9 is performed, using an identical wireless channel, so that switching processing of a wireless channel is unnecessary. As a result, occurrence of a time loss due to the channel switching is suppressed.

In the modification, even when the connection of the STA mode communication and the connection of the P2P mode communication have been established, the establishment of the connection of the STA mode communication and the connection of the P2P mode communication may be performed using an identical wireless channel. In addition, a base station 3 before the searching and a base station after the searching may not be identical. Therefore, the range of an application example or the like to which the processing of the modification is allowed to be applied is widened.

In the modification, the case in which the connection of the P2P mode communication is requested is described as an example, but the embodiment is not limited to such a case. When the connection of the STA mode communication is requested, a wireless channel used for the STA mode communication may be changed.

Modification 3 of the Third Embodiment

A modification 3 of the third embodiment is described below. In the modification, the same symbol is assigned to a configuration or an operation similar to that of the first embodiment to the third embodiment and the modifications 1 and 2 of the third embodiment, and a repeated description is omitted herein. The modification is a modification of the setting method of a wireless channel in the example in which the wireless communication device 70 according to the third embodiment performs, while performing the STA mode communication 7 with the base station 3, the P2P mode communication 9 with the wireless communication device 5. The modification is an example in which the same wireless channel as the STA mode communication is set for the P2P mode communication when the connection of the STA mode communication and the connection of the P2P mode communication have been established. The modification may be applied to an example in which a plurality of base stations 3 and a plurality of wireless communication devices 5 exist within a range in which the wireless communication device 70 is allowed to perform communication with the base stations and the wireless communication devices, similar to the modification 2 of the third embodiment.

Figure 25:
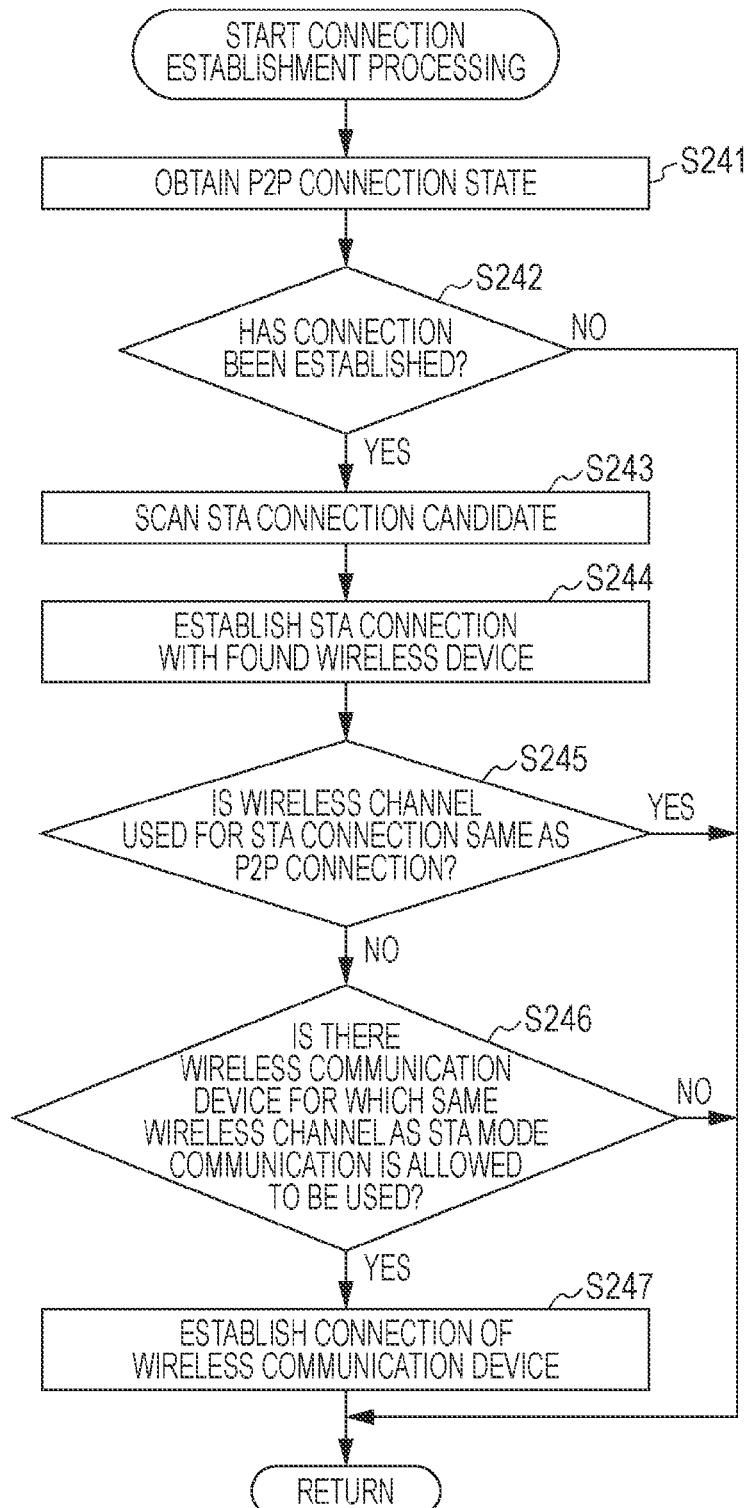
FIG. 25 is a flowchart illustrating an example of connection establishment processing in a modification 3 of the third embodiment.

The connection establishment processing in the embodiment is described below in detail with reference to a flowchart. FIG. 25 is a flowchart illustrating an example of connection establishment processing in the modification 3 of the third embodiment. Such processing is an example of connection establishment processing when the connection of the STA mode communication is requested, instead of the connection request of the P2P mode communication, in S151 of FIG. 16. As illustrated in FIG. 25, the connection information obtaining section 83 of the channel setting section 81 obtains the connection state of the P2P mode, with reference to the connection information 228 stored in the storage section 91 (S241). The connection information obtaining section 83 determines whether the connection of the P2P mode communication has been established, based on the connection information 228 (S242). For example, when information on the P2P mode communication is stored in storage section 91, the connection information obtaining section 83 determines that the connection of the P2P mode communication has been established (S242: YES). When the connection of the P2P mode communication is not established (S242: NO), the connection information obtaining section 83 ends the connection establishment processing.

When the connection of the P2P mode communication has been established (S242: YES), the search section 85 of the channel setting section 81 scans a connectable STA connection candidate (S243). The scanning is performed, for example, by the method described with reference to FIGS. 18 to 20. That is, the search section 85 may perform the searching, for example, by passive scanning. When a channel to be used is set in advance, the search section 85 may perform active scanning using the set wireless channel.

The connection establishment section 87 establishes the connection of the STA mode communication 7 with one of the found base stations (S244). The connection information obtaining section 83 determines whether the wireless channel used for the STA mode communication 7 in which the connection has been established and the wireless channel used for the P2P mode communication are identical or not, for example, with reference to the connection information 228 (S245). When an identical wireless channel is used (S245: YES), for example, the wireless communication device 70 performs the P2P mode communication 9 while performing the STA mode communication 7.

When different wireless channels are used (S245: NO), the search section 85 checks whether there is a wireless communication device 5 for which the same wireless channel as the STA mode communication 7 is allowed to be used (S246). In this case, the search section 85 searches for a wireless communication device 5 that is the communication partner, for example, by the active scanning.

When a wireless communication devices 5 for which the same wireless channel as the STA mode communication 7 is allowed to be used have been found (S246: YES), the connection establishment section 87 establishes the connection of the P2P mode communication 9 with one of the wireless communication devices 5 using the same wireless channel as the STA mode communication 7 (S247). When the wireless communication device 5 that is the communication partner before the searching and the found wireless communication device 5 are different, the connection of the wireless communication before the searching is released, and the connection of the communication with the found wireless communication device 5 is established. The P2P mode communication 9 in which the connection has been established at that time is an example of the third wireless communication. In addition, in the wireless communication device 70, the flow returns to the processing of FIG. 16, and for example, the wireless communication device 70 executes processing of transmission and reception of data, and the like. When the wireless communication device 5 in which the connection has been already established is allowed to use a wireless channel in the STA mode communication 7, the wireless channel may be changed to establish the connection. In this case, between the wireless communication device 70 and the wireless communication device 5, the connection of the P2P mode communication 9 is established without the base station 3. In S246, when a wireless communication device for which the same wireless channel as the STA mode communication is allowed to be used is not found (S246: NO), the wireless communication device 70 ends the connection establishment processing.

As described above, in the modification, when the connection of the P2P mode communication has been established, the connection of the STA mode communication is established using a certain wireless channel. After the connection of the STA mode communication and the connection of the P2P mode communication have been established, when it is determined that different wireless channels are used, based on the connection information 228, the connection of the P2P mode communication 9 with a wireless communication device 5 using the same wireless channel as the STA mode communication 7 is established. In this case, the communication partner of the P2P mode communication 9 may not be the same as the wireless communication device 5 that is the communication partner of the connection that has been maintained before the connection of the P2P mode communication 9 is established. The wireless communication device 70 changes the wireless channel used for the wireless communication with the wireless communication device 5 to which the wireless communication device 70 has been previously connected or releases the maintained connection to establish further P2P mode communication 9 with a wireless communication device 5. In this case, the P2P mode communication 9 is an example of the third wireless communication.

As described above, the wireless communication device 70 according to the modification 3 of the third embodiment performs, while performing the STA mode communication 7 with the base station 3, the P2P mode communication 9 with the wireless communication device 5, using an identical wireless channel. In the modification, for example, the channel setting section 81 sets the same wireless channel as the STA mode communication, for the P2P mode communication. In addition, the wireless communication device 70 performs the STA mode communication 7 and the P2P mode communication 9 so as to perform switching between the STA mode communication 7 and the P2P mode communication 9 by time division. Therefore, in the wireless communication device 70, when the P2P mode communication 9 is performed while performing the STA mode communication 7 switching processing of a wireless channel is unnecessary. As a result, occurrence of a time loss due to the channel switching is suppressed.

In the modification, even when the connection of the STA mode communication and the connection of the P2P mode communication have been already established, the establishment of the connection of the STA mode communication and the connection of the P2P mode communication may be performed using an identical wireless channel. In addition, the wireless communication device 5 before the searching and the wireless communication device 5 after the searching may not become identical. Therefore, a range of an application example or the like to which the processing in the modification is allowed to be applied is widened.

In the modification, the case in which the connection of the STA mode communication is requested is described as an example, but the embodiment is not limited to such a case. When the connection of the P2P mode communication is requested, a wireless channel used for the P2P mode communication may be changed.

Fourth Embodiment

Figure 26:
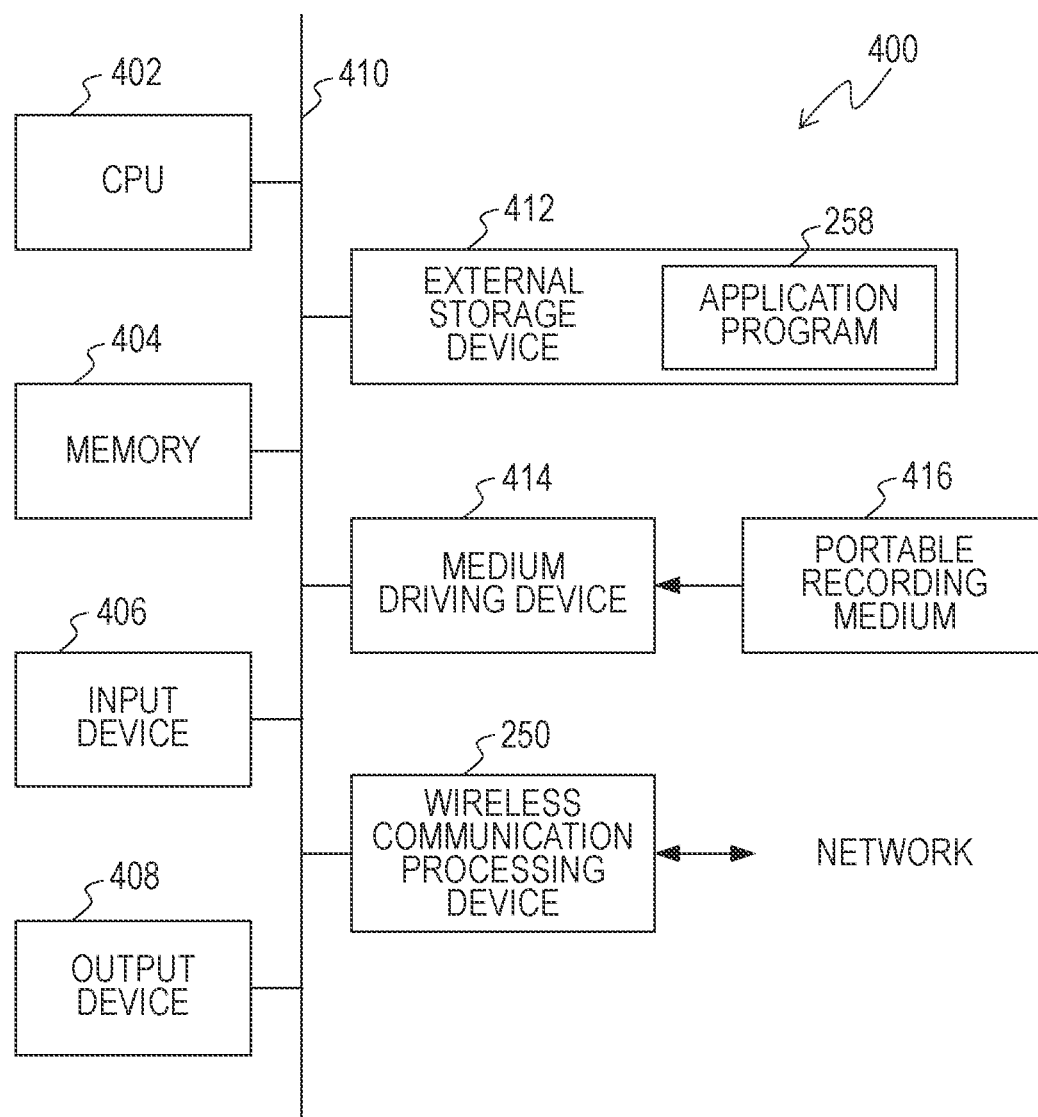
FIG. 26 is a diagram illustrating an example of a hardware configuration of a wireless communication device according to a fourth embodiment.

A wireless communication device according to a fourth embodiment is described below with reference to drawings. The fourth embodiment is an application example of the wireless communication device according to the first embodiment to the third embodiment and the modifications 1 to 3 of the third embodiment. As illustrated in FIG. 26, a wireless communication device 400 may be also a utilization example of the wireless communication device according to the first embodiment to the third embodiment and the modifications 1 to 3 of the third embodiment. In the fourth embodiment, the same symbol is assigned to a configuration or an operation similar to that of the first embodiment to the third embodiment and the modifications 1 to 3 of the third embodiment, and a repeated description is omitted herein.

The fourth embodiment is an example in which an application program is executed that causes certain processing including processing in which the wireless communication device 400 performs, while performing STA mode communication 291 with a base station 3, P2P mode communication 299 with a wireless communication device 5. In the embodiment, as an example of the application program, an application program 258 is employed that is used to perform an operation in which a movie on the Internet is transferred to the wireless communication device 5 through a wireless communication processing device 250 via the base station 3.

FIG. 26 is a block diagram illustrating an example of a hardware configuration of the wireless communication device 400 according to the fourth embodiment. As illustrated in FIG. 26, in the wireless communication device 400, a central processing unit (CPU) 402, a memory 404, an input device 406, an output device 408, an external storage device 412, a medium driving device 414, the wireless communication processing device 250, and the like, are coupled to each other through a bus 410.

The CPU 402 is an arithmetic processing device that controls an operation of the entire wireless communication device 400, and functions as one or more processors used to execute the application program. The memory 404 is a storage section that stores, in advance, a program used to control the operation of the wireless communication device 400, and is used as a work area at the time of execution of the program as appropriate. The memory 404 is, for example, a random access memory (RAM), a read only memory (ROM), or the like. The input device 406 is, for example, a keyboard device, a mouse device, or the like and obtains inputs of various pieces of information from the user, which are associated with an operation content when the wireless communication device 400 is operated by the user and transmits the obtained input information to the CPU 402. The output device 408 is a device that outputs a processing result of the wireless communication device 400, and includes a display device. For example, the display device displays a text or an image depending on display data transmitted from the CPU 402.

The external storage device 412 is, for example, a storage device such as a hard disk drive, and is a device that stores various control programs executed by the CPU 402, the obtained data, and the like. The medium driving device 414 is a device used to perform writing and reading on a portable recording medium 416. The CPU 402 may execute various control processing by reading and executing a certain control program recorded to the portable recording medium 416, through the medium driving device 414. The portable recording medium 416 is, for example, a compact disc (CD) ROM, a digital versatile disc (DVD), a Universal Serial Bus (USB) memory, or the like. The wireless communication processing device 250 is an interface device that manages transmission and reception of various pieces of data, which are wirelessly performed to and from the outside. The bus 410 is a communication path that connects the above-described devices and the like and performs transmission and reception of data.

The application program 258 that causes the wireless communication device 400 according to the fourth embodiment to execute the processing in which a movie on the Internet is transferred to the wireless communication device 5 is stored, for example, in the external storage device 412. The CPU 402 issues an instruction of wireless communication to the wireless communication processing device 250 when the wireless communication is performed due to execution of the application program 258. As a result, when the wireless communication device 400 executes the processing in which the movie and the like that have been received from the base station 3 are transferred to the wireless communication device 5, the wireless communication device 400 executes the processing in which while performing the STA mode communication 291, the P2P mode communication 299 is performed, through the wireless communication processing 250. As described above, the application program 258 includes a program used to perform an operation in which the movie on the Internet is transferred to the wireless communication device 5 through the wireless communication processing device 250 via the base station 3, as an example.

The CPU 402 executes, for example, communication processing by an application by reading a program from the external storage device 412 and executing the program using the memory 404. In this case, first, a control program such as the application program 258 used to cause the CPU 402 to execute the communication processing is created and stored in the external storage device 412. In addition, a certain instruction is issued from the input device 406 to the CPU 402, and the control program is executed so as to be read from the external storage device 412. In addition, such a program may be stored in the portable recording medium 416. The wireless communication device 400 is, for example, a personal computer, a multi-function mobile phone, a tablet information processing device, or the like, that includes a communication function.

Figure 27:
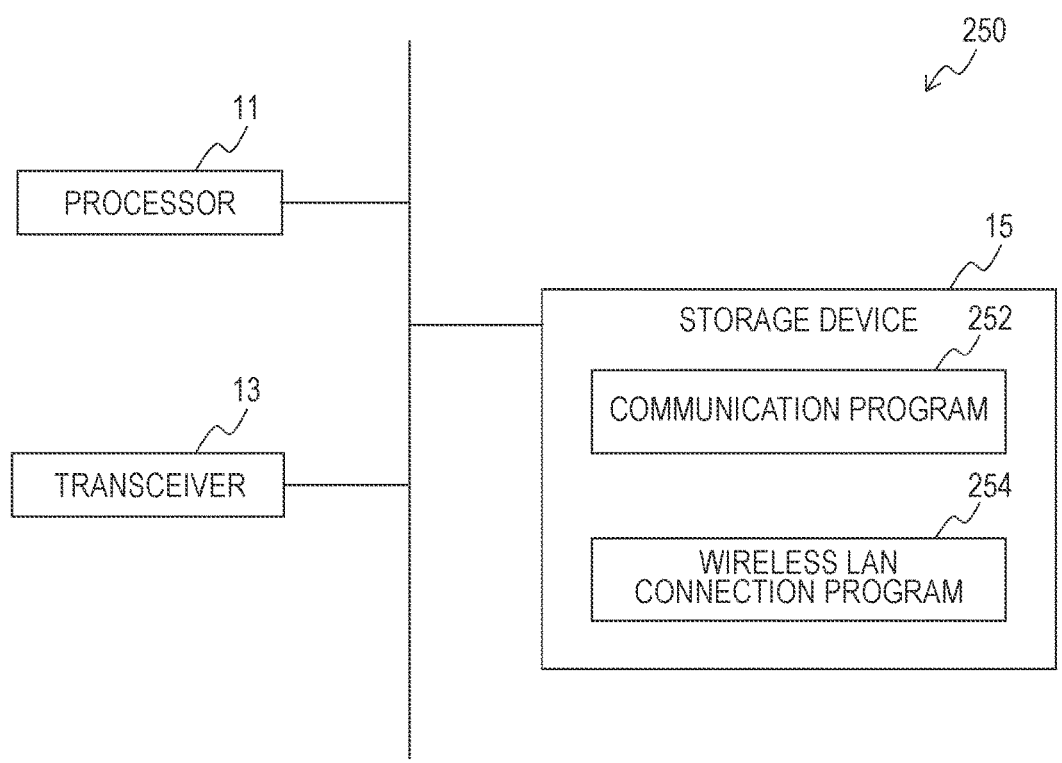
FIG. 27 is a diagram illustrating an example of a hardware configuration of a wireless communication processing device installed in the wireless communication device according to the fourth embodiment.

FIG. 27 is a diagram illustrating an example of a hardware configuration of the wireless communication processing device 250 provided in the wireless communication device 400 according to the fourth embodiment. As illustrated in FIG. 27, the wireless communication processing device 250 includes one or more processors 11, a transceiver 13, and a storage device 15. In the wireless communication processing device 250, the storage device 15 stores, for example, in advance, a wireless communication program 252, a wireless LAN connection program 254, and the like.

The wireless communication program 252 is a program used to control a basic operation in the wireless communication processing device 250 according to the fourth embodiment, and an operation related to the connection establishment processing. The wireless LAN connection program 254 is a program used to control the communication using a wireless LAN. In the wireless communication processing device 250, the one or more processors 11 execute, for example, the communication processing in the wireless communication processing device 250 by reading and executing various programs including the wireless communication program 252.

Figure 28:
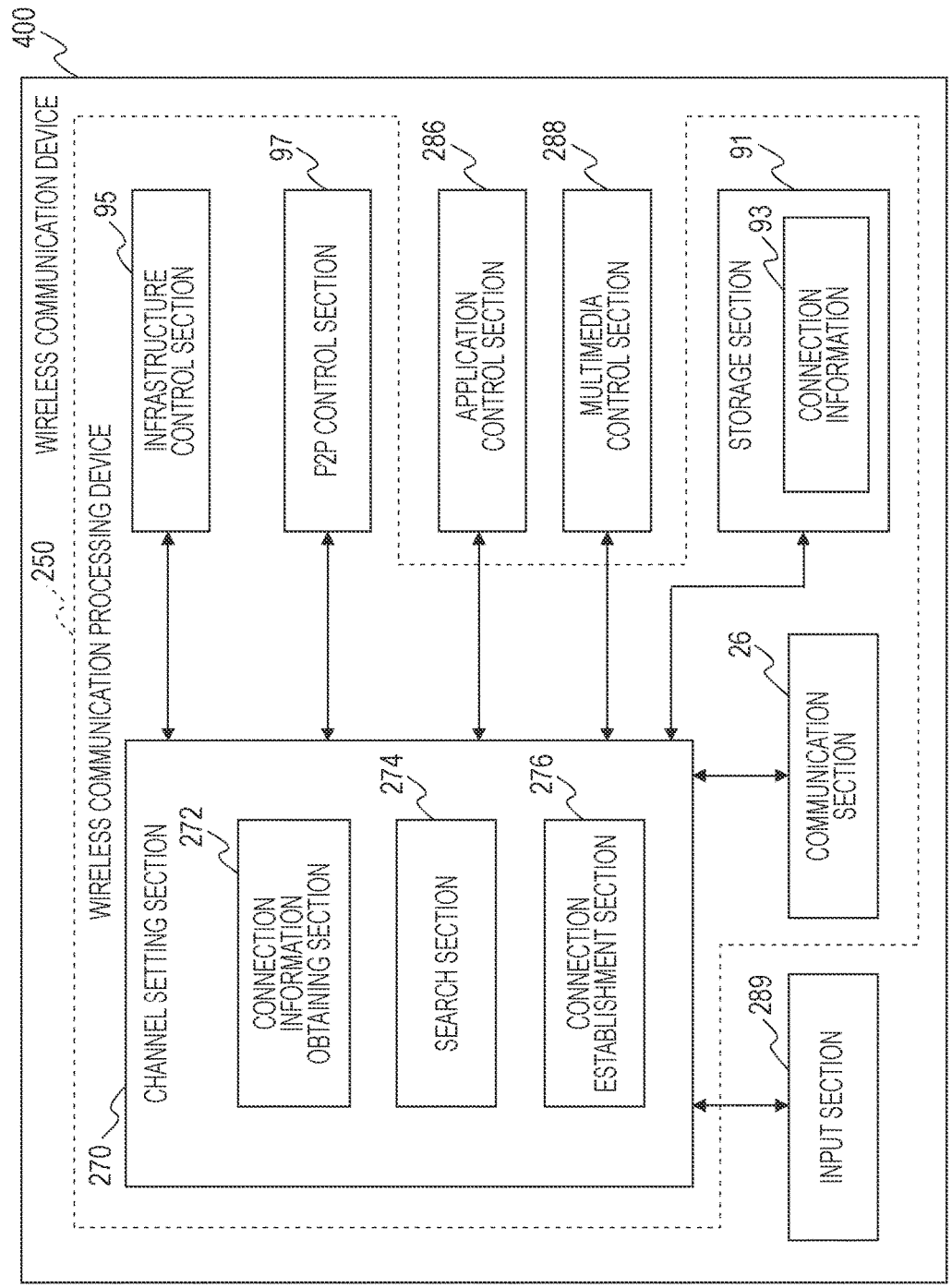
FIG. 28 is a block diagram illustrating an example of a function configuration of the wireless communication device according to the fourth embodiment.

FIG. 28 is a block diagram illustrating an example of a function configuration of the wireless communication device 400 according to the fourth embodiment. As illustrated in FIG. 28, the wireless communication device 400 includes a channel setting section 270, a communication section 26, an infrastructure control section 95, a P2P control section 97, and a storage section 91 included in the wireless communication processing device 250. The channel setting section 270 includes a connection information obtaining section 272, a search section 274, and a connection establishment section 276. The storage section 91 stores, for example, the connection information 93. In addition, the wireless communication device 400 further includes an input section 289, an application control section 286, and a multimedia control section 288.

For example, when the connection of at least one of the wireless communications of the STA mode communication 291 and the P2P mode communication 299 has been established, the channel setting section 270 sets the wireless channel for the other wireless communication to the same wireless channel as that used for one wireless communication. In the embodiment, when the connection of at least one of the STA mode communication and the P2P mode communication has been established, either the above-described third embodiment and modifications 1 to 3 of the third embodiment may be employed as the connection establishment method in which the connection of the STA mode communication and the connection of the P2P mode communication are established using the same wireless channel.

The connection information obtaining section 272 obtains information on the connection that has been already established, with reference to the connection information 93 stored in the storage section 91. The search section 274 searches for a base station or a wireless communication device for which the same wireless channel as the connection that has been already established is allowed to be used. The connection establishment section 276 executes processing of establishing the connection with the base station or the wireless communication device found by the search section 274.

The application control section 286 is achieved, for example, by causing the CPU 402 to execute the application program 258. The application control section 286 controls various processing related to the application program 258. The multimedia control section 288 controls reproduction processing of audio and an image. The multimedia control section 288 is achieved, for example, by causing the CPU 402 to read and execute the application program 258, a multimedia program that is not illustrated, and the like.

As described above, in the embodiment, the application control section 286 causes the wireless communication device 400 to executes the data transfer processing including the wireless communication processing in which while performing the STA mode communication 291 with the base station 3, the P2P mode communication 299 with the wireless communication device 5 is performed. In this case, the application control section 286 executes the wireless communication processing by causing the wireless communication processing device 250 to execute the wireless communication program 252 and the wireless LAN connection program 254. For example, when the application program 258 includes the reproduction processing of audio and an image, the multimedia control section 288 controls the reproduction processing. The input section 289 corresponds to the input device 406.

The functions of the channel setting section 270, the infrastructure control section 95, and the P2P control section 97 of the wireless communication processing device 250 are achieved, for example, by causing the one or more processors 11 to read and execute the wireless communication program 252 and the wireless LAN connection program 254. Some of the functions of the wireless communication processing device 250 may be provided as hardware such as an integrated circuit. In addition, some of the above-described functions of the wireless communication device 400 may be provided as hardware such as an integrated circuit.

Figure 29:
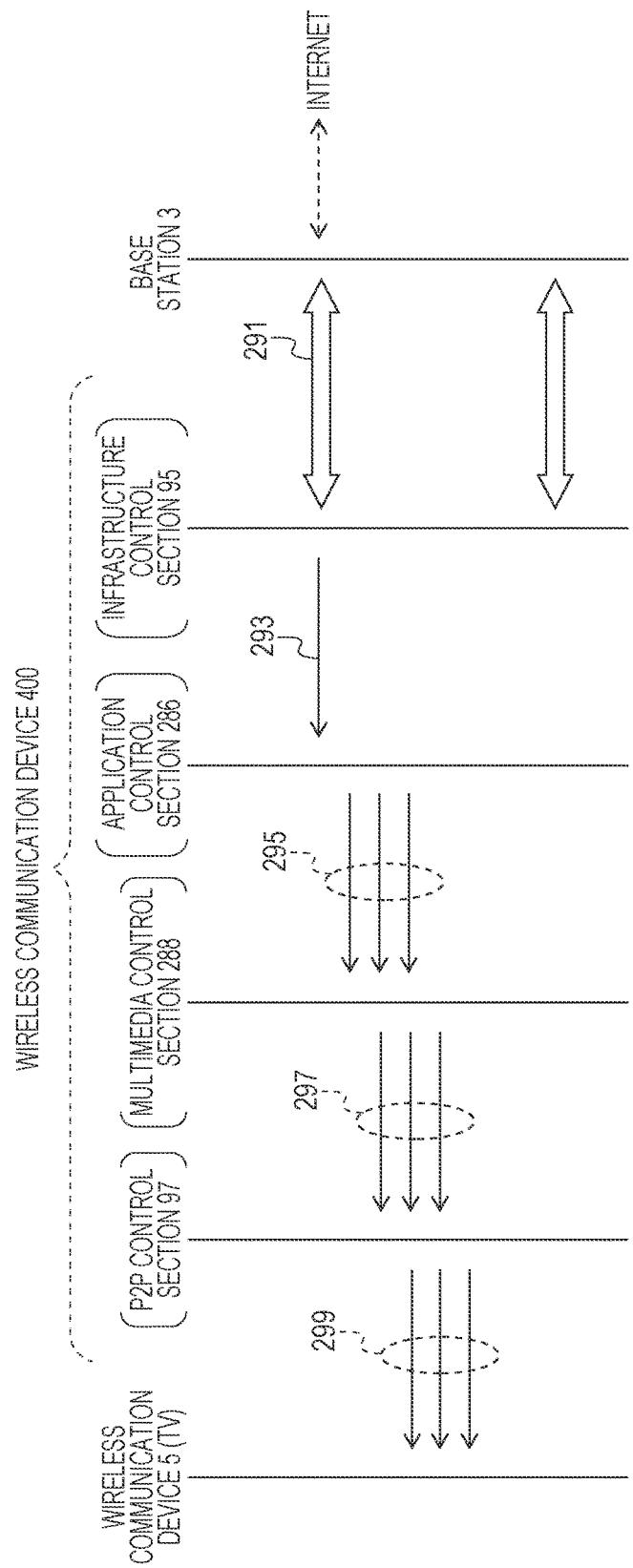
FIG. 29 is a diagram illustrating an example of a communication sequence between the wireless communication device, and a base station, and a wireless communication device of the communication partner according to the fourth embodiment.

FIG. 29 is a diagram illustrating an example of a communication sequence between the wireless communication device 400, the base station 3, and the wireless communication device 5 according to the fourth embodiment. In such an example, it is assumed that the wireless communication device 5 is a TV receiver. The base station 3 is coupled to the Internet. The wireless communication processing device 250 receives a movie on the Internet through the base station 3, and transfer the movie to the wireless communication device 5.

Communication 290 indicates communication that is performed between the base station 3 and a server computer that is not illustrated and coupled to the Internet, through the Internet. The STA mode communication 291 indicates communication performed between the base station 3 and the wireless communication device 400. Data 293 to 297 correspond to data processing in the wireless communication device 400. The P2P mode communication 299 indicates P2P communication performed between the wireless communication device 400 and the wireless communication device 5.

As illustrated in FIG. 29, the wireless communication processing device 250 receives a wireless signal including data from a computer on the Internet though the base station 3, in accordance with a hypertext transfer protocol (HTTP) by the STA mode communication 291. In the embodiment, for example, the data is video data including audio. In the wireless communication device 400, for example, the infrastructure control section 95 outputs the data 293 that has been obtained by executing demodulation processing, baseband processing, and the like for the wireless signal that has been received through the communication section 26, to the application control section 286. The application control section 286 analyzes the data 293, for example, by separating the data of the video and audio, and outputs the data 293 to the multimedia control section 288. The multimedia control section 288 executes decode processing for the input data, encodes the data, and outputs data 297 to the P2P control section 97. In the P2P control section 97, baseband processing of the data 297, conversion processing into a wireless signal, and the like, are executed through the communication section 26, and the obtained data is transmitted to the wireless communication device 5 using the P2P mode communication 299. As described above, the wireless communication device 400 performs real-time protocol (RTP) transfer of the data received from the base station 3, to the wireless communication device 5. In this case, while performing the STA mode communication 291 with the base station 3, the P2P mode communication 299 with the wireless communication device 5 is performed using an identical wireless channel, so that the channel switching processing is not included in the above-described sequence in the wireless communication device 400.

Figure 30:
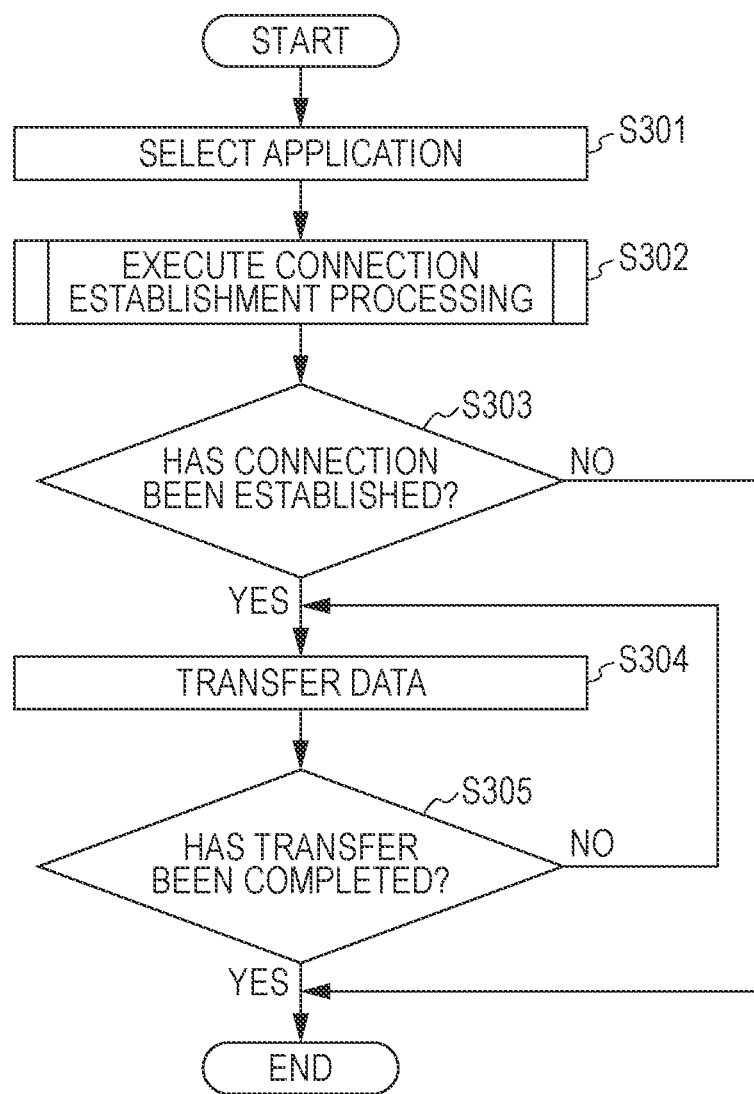
FIG. 30 is a flowchart illustrating an operation of the wireless communication device according to the fourth embodiment.

An operation of the wireless communication device 400 according to the fourth embodiment is described below with reference to a flowchart. FIG. 30 is a flowchart illustrating the operation of the wireless communication device 400 according to the fourth embodiment. As described above, the fourth embodiment corresponds to an example in which the wireless communication device 400 executes the application program 258.

As illustrated in FIG. 30, the application control section 286 receives selection of the application program 258 at the input section 289 through the input device 406 (S301). The channel setting section 270 of the wireless communication processing device 250 executes the connection establishment processing (S302). The channel setting section 270 determines whether the connection of the STA mode communication and the connection of the P2P mode communication have been established, and when not both of the connection of the STA mode communication and the connection of the P2P mode communication are established (S303: NO), the processing ends. When the connection of the STA mode communication and the connection of the P2P mode communication have been established (S303: YES), as described in FIG. 29, the channel setting section 270 executes the data transfer processing (S304) until the data transfer processing is completed (S305: NO). The transfer processing is executed by performing the STA mode communication 291 and the P2P mode communication 299 using an identical wireless channel. When the transfer processing has been completed (S305: YES), in the wireless communication device 400, the processing ends. The connection establishment processing of S302 may be applied, for example, to the various methods described in the first embodiment to the third embodiment and the modifications 1 to 3 of the third embodiment.

As described above, the wireless communication device 400 according to the fourth embodiment performs, while performing the STA mode communication 291 with the base station 3, the P2P mode communication 299 with the wireless communication device 5, using an identical wireless channel. When the wireless communication device 400 performs the STA mode communication 291 and the P2P mode communication 299 so as to perform switching between the STA mode communication 291 and the P2P mode communication 299 by time division, for example, the following processing is executed.

When execution of the application program 258 is selected in the wireless communication device 400, the wireless communication processing device 250 establishes the connection of the STA mode communication 291 and the connection of the P2P mode communication 299 by active scanning, using an identical wireless channel that has been set in advance. Alternatively, when the connection of at least one of the STA mode communication 291 and the P2P mode communication 299 has been established, the wireless communication processing device 250 sets the wireless channel for the other communication to the wireless channel for one communication in which the connection has been established. In this case, the wireless communication processing device 250 establishes the connection of communication that is to be performed newly using the same wireless channel as the communication that has been already performed. Alternatively, the wireless channel of the connection of one of the two communications, which has been already established, is changed to the same wireless channel as that of the other communication. Alternatively, the wireless communication processing device 250 establishes the connection of one of the two communications, which has been already established, with another communication partner who uses the same wireless channel as that of the other communication. As a result, in the wireless communication device 400, an identical wireless channel is used for the STA mode communication 291 and the P2P mode communication 299. Therefore, in the wireless communication device 400, when switching is performed between the STA mode communication 291 and the P2P mode communication 299, processing of channel switching in which a frequency is switched is unnecessary, and occurrence of a time loss is suppressed. As a result, a reduction in the efficient of transmission and reception of data in a wireless LAN is avoided.

In addition, in the wireless communication device 400 according to the fourth embodiment, data of a video, audio, and the like, may be efficiently downloaded from a computer on the Internet to the wireless communication device 5 such as the TV receiver through the wireless communication processing device 250, and the data of output may be performed. In this case, the data reception processing from the base station 3 and the data transmission processing to the wireless communication device 5 are performed so as to be switched by time division. In such switching, switching of a wireless channel is unnecessary. Therefore, even in large-capacity data such as high-definition image data and the like, the download and output are performed without any problem. In this case, it is unnecessary for the wireless communication device 5 to establish the connection with the base station 3, and it is only sufficient for the wireless communication device 5 to perform P2P connection with the wireless communication device 400 using a certain wireless channel. Therefore, an installation location of the wireless communication device 5 may not be a location in which a communication environment with the base station 3 is good, and constraint in a utilization environment of the wireless communication device 5 may be reduced.

The wireless communication device 400 according to the fourth embodiment may be used as a utilization example of the communication method in the first embodiment to the third embodiment and the modifications 1 to 3 of the third embodiment. That is, as the communication method by the wireless communication processing device 250 according to the fourth embodiment, the communication method described in the first embodiment to the third embodiment and the modifications 1 to 3 of the third embodiment may be used as described above.

In this case, for example, the one or more processors 11, the transceiver 13, and the storage device 15 in the wireless communication device 1, the wireless communication device 20, or the wireless communication device 70 respectively correspond to the one or more processors 11, the transceiver 13, and the storage device 15 in the wireless communication processing device 250. In addition, the input device 72 of the wireless communication device 70 corresponds to the input device 406. As a result, a wireless communication device by the utilization example of the first embodiment to the third embodiment and the modifications 1 to 3 of the third embodiment may obtain an effect similar to that of the wireless communication device 400 according to the fourth embodiment. In addition, the above-described utilization examples may respectively obtain effects of the first embodiment to the third embodiment and the modifications 1 to 3 of the third embodiment.

The embodiments are not limited to the above-described examples, and various configurations or examples may be obtained within a range that is not departing from the gist of the embodiment. For example, some of the function configurations described in each of the above-described embodiments may be configured as hardware. In addition, the function configurations in the above-described first embodiment to third embodiment and modifications 1 to 3 of the third embodiment are examples, and a further configuration that obtains a similar effect may be employed. The procedure of each of the flowcharts is not limited to the above-described example, and a further procedure that obtains a similar effect may be employed. The configuration of the data such as the connection information 93, the configuration of each of the programs, and the like are not limited to the above-described examples.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first wireless communication device, comprising:
a memory including instructions stored thereon; and
one or more processors coupled to the memory and configured to direct performance of operations based on the instructions in which the operations include,
while performing first wireless communication with a base station using a wireless channel, perform, using the wireless channel without the base station, second wireless communication with a second wireless communication device in which the first wireless communication and the second wireless communication are performed by time division such that the base station and the second wireless device switch as being a communication partner with the first wireless communication device according to the time division to allow for the first wireless communication to be performed while performing the second wireless communication, wherein the wireless channel is selected based on the wireless channel already being used for a particular wireless communication that is one of the first wireless communication or the second wireless communication.

2. The wireless communication device according to claim 1, wherein
the one or more processors
obtain identification information of the communication partner of the particular wireless communication, and channel information indicating the wireless channel,
search for a communication partner of a third wireless communication using the wireless channel indicated by the obtained channel information, based on the identification information, and
establish connection of wireless communication using the wireless channel with the found communication partner in a case where the communication partner is found.

3. The wireless communication device according to claim 1, wherein
the base station is a wireless LAN access point, the first wireless communication is communication in an infrastructure mode, and the second wireless communication is communication in a peer-to-peer mode.

4. The wireless communication device according to claim 1, wherein
in a case where connection of an other wireless communication that is the other one of the first wireless communication or the second wireless communication that is not the particular wireless communication is not established, the one or more processors set the wireless channel as being used in the other wireless communication.

5. The wireless communication device according to claim 1, wherein
in a case where the wireless channel is used for the particular wireless communication, and a different wireless channel is used for other wireless communications with the communication partner that is not part of the particular wireless communication, the one or more processors change the different wireless channel to the wireless channel.

6. The wireless communication device according to claim 5, wherein
the one or more processors release setting of the different wireless channel used for the other wireless.

7. The wireless communication device according to claim 1, wherein
the one or more processors
obtain identification information of the communication partner of the particular wireless communication, and channel information indicating the wireless channel,
search for the communication partner of an other wireless communication that is the other one of the first wireless communication or the second wireless communication that is not the particular wireless communication using the wireless channel indicated by the obtained channel information, based on the identification information, and
establish connection of wireless communication using the wireless channel with the found communication partner in a case where the communication partner is found.

8. A wireless communication method executed by a first wireless communication device, which causes one or more processors coupled to a memory to execute a process, the process comprising:
while performing first wireless communication with a base station using a wireless channel, performing second wireless communication, using the wireless channel without the base station, with a second wireless communication device in which the first wireless communication and the second wireless communication are performed by time division such that the base station and the second wireless device switch as being a communication partner with the first wireless communication device according to the time division to allow for the first wireless communication to be performed while performing the second wireless communication, wherein the wireless channel is selected based on the wireless channel already being used for a particular wireless communication that is one of the first wireless communication or the second wireless communication.

9. The wireless communication method according to claim 8, wherein
in a case where the wireless channel is used for the particular wireless communication, and a different wireless channel is used for other wireless communications with the communication partner that is not part of the particular wireless communication, the one or more processors change the different wireless channel to the wireless channel.

10. The wireless communication method according to claim 9, wherein
the one of the wireless communications, the one or more processors release setting of the different wireless channel used for the other wireless.

11. The wireless communication method according to claim 8, wherein
the base station is a wireless LAN access point, the first wireless communication is communication in an infrastructure mode, and the second wireless communication is communication in a peer-to-peer mode.

12. The wireless communication method according to claim 8, wherein
in a case where connection of an other wireless communication that is the other one of the first wireless communication or the second wireless communication that is not the particular wireless communication is not established, the one or more processors set the wireless channel as being used in the other one of the wireless communication.

13. A non-transitory, computer-readable recording medium having stored therein a wireless communication program for causing a computer to execute a process, the process comprising:
while performing first wireless communication with a base station using a wireless channel, directly performing second wireless communication, using the wireless channel without the base station, with a second wireless communication device in which the first wireless communication and the second wireless communication are performed by time division such that the base station and the second wireless device switch as being a communication partner with the first wireless communication device according to the time division to allow for the first wireless communication to be performed while performing the second wireless communication, wherein the wireless channel is selected based on the wireless channel already being used for a particular wireless communication that is one of the first wireless communication or the second wireless communication.

14. The non-transitory, computer-readable recording medium according to claim 13, wherein
in a case where the wireless channel is used for the particular wireless communication, and a different wireless channel is used for other wireless communications with the communication partner that is not part of the particular wireless communication, the computer changes the different wireless channel, to the wireless channel.

15. The non-transitory, computer-readable recording medium according to claim 14, wherein
the computer releases setting of the different wireless channel used for the other wireless.

16. The non-transitory, computer-readable recording medium according to claim 13, wherein
in a case where connection of an other wireless communication that is the other one of the first wireless communication or the second wireless communication that is not the particular wireless communication is not established, the computer sets the wireless channel as being used in the other wireless communication.

17. The non-transitory, computer-readable recording medium according to claim 13, wherein
the base station is a wireless LAN access point, the first wireless communication is communication in an infrastructure mode, and the second wireless communication is communication in a peer-to-peer mode.

* * * * *